United States Patent [19]

Taira et al.

[11] Patent Number: 6,125,232
[45] Date of Patent: *Sep. 26, 2000

[54] LARGE-CAPACITY RECORDING MEDIUM, METHOD AND APPARATUS FOR REPRODUCING DATA FROM A LARGE CAPACITY RECORDING MEDIUM, AND METHOD AND APPARATUS FOR RECORDING DATA ON A LARGE-CAPACITY RECORDING MEDIUM

[75] Inventors: Kazuhiko Taira; Shinichi Kikuchi; Hideki Mimura; Yuzo Tamada, all of Yokohama; Masatoshi Nakai, Kawasaki, all of Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/060,212

[22] Filed: Apr. 15, 1998

Related U.S. Application Data

[63] Continuation of application No. 08/561,853, Nov. 22, 1995, Pat. No. 5,778,142.

[30] Foreign Application Priority Data

Nov. 24, 1994 [JP] Japan ..................................... 6-289657
Jan. 27, 1995 [JP] Japan ..................................... 7-012049

[51] Int. Cl.⁷ ...................................................... H04N 5/76
[52] U.S. Cl. ................................ 386/95; 386/98; 386/126
[58] Field of Search .................................. 386/46, 47, 95, 386/97, 98, 125, 126, 45, 39; H04N 5/76, 5/92, 5/781

[56] References Cited

U.S. PATENT DOCUMENTS

| | | | |
|---|---|---|---|
| 5,598,276 | 1/1997 | Cookson et al. | 386/126 |
| 5,619,338 | 4/1997 | Nakai et al. | 386/126 |
| 5,655,052 | 8/1997 | Nakai et al. | 386/126 |
| 5,715,356 | 2/1998 | Hirayama et al. | 386/125 |

FOREIGN PATENT DOCUMENTS

| | | |
|---|---|---|
| 0 325 325 | 7/1989 | European Pat. Off. . |
| 0 521 487 | 1/1993 | European Pat. Off. . |
| 561 435 | 9/1993 | European Pat. Off. . |
| WO 94/07332 | 3/1994 | WIPO . |

Primary Examiner—Thai Tran
Attorney, Agent, or Firm—Pillsbury Madison & Sutro LLP

[57] ABSTRACT

Recorded at high density on an optical disk are at least one title set and a volume information file. The title set consists of a plurality of files aligned on a boundary between logical sectors. The files store title set management information and data objects to be reproduced. To retrieve data from the optical disk, volume file information is read out, thereby acquiring information about the desired title set. Then, the information for indicating steps or reproducing the data object and managing the desired title set is acquired. Using the title set management information, data is reproduced from the optical disk.

18 Claims, 22 Drawing Sheets

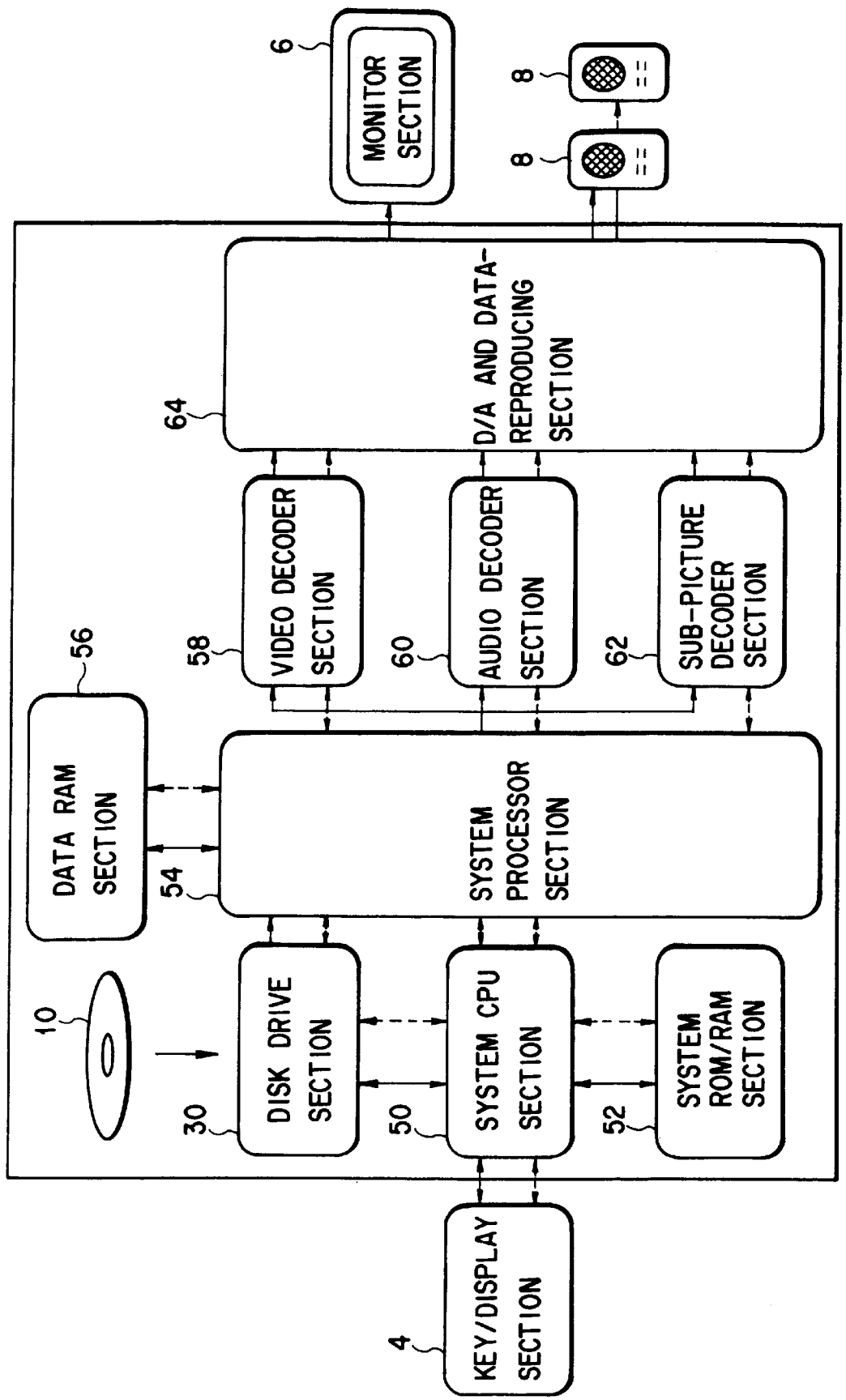
F I G. 1

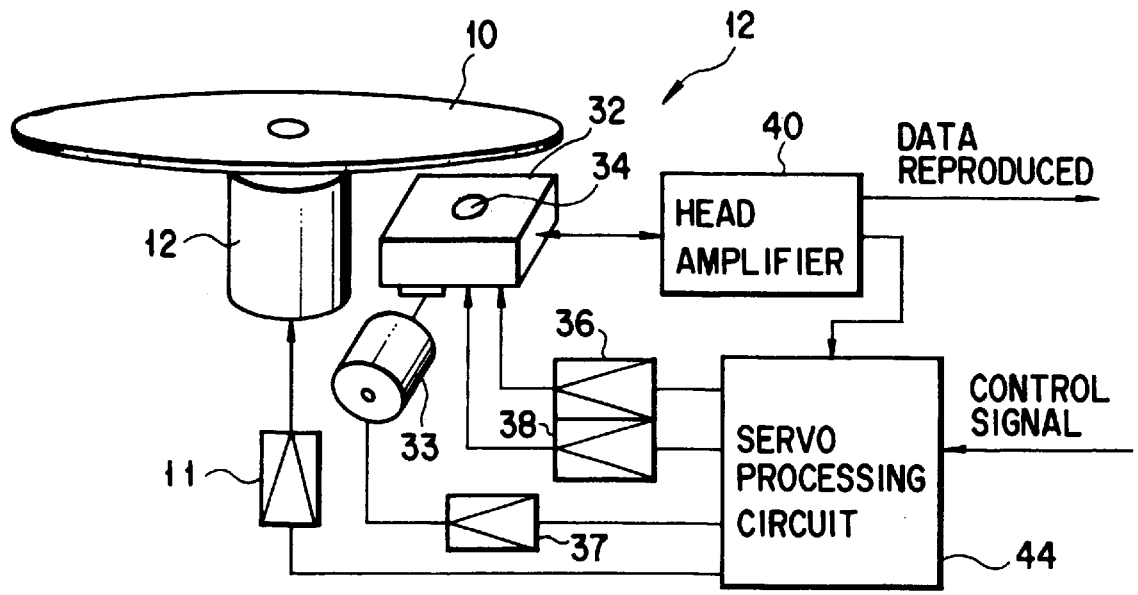
F I G. 2
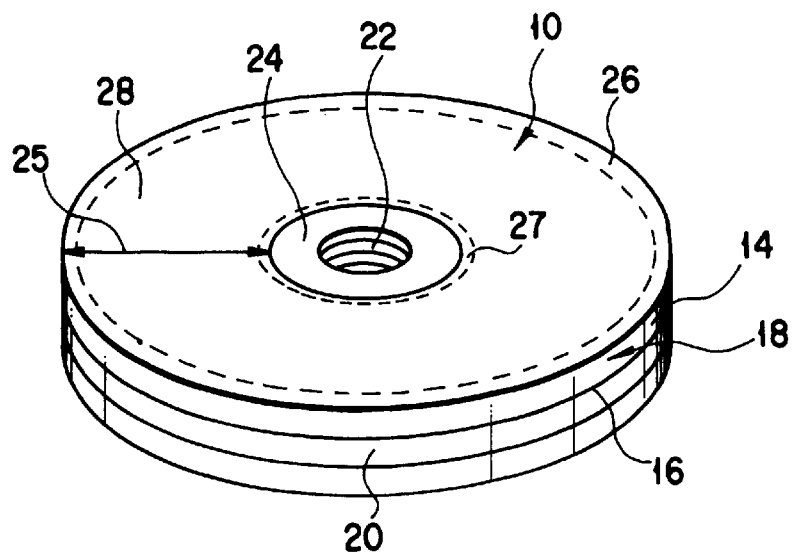
F I G. 3

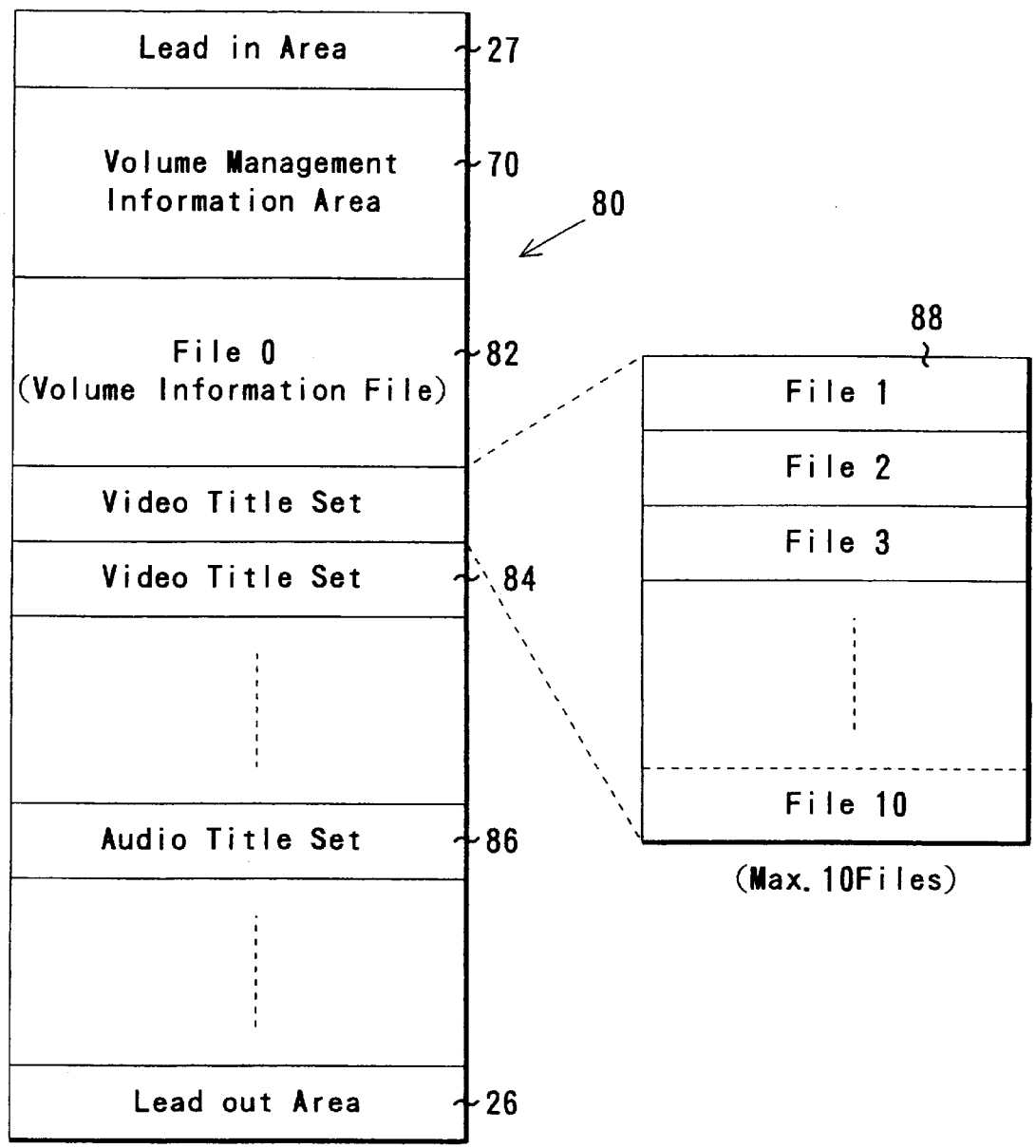
F I G. 4

| VMIFMT | |
|---|---|
| | Contents |
| VMIFID | Volume Information File Identifier |
| SZVMIF | Size of Volume Information File |
| VMCAT | Volume Category |
| SATXTIT | TXTIT Start Address |
| SATSISPT | TSISPT Start Address |
| SATSATRT | TSATRT Start Address |
| SATSMPGCIBTG | TSMPGCIBTG Start Address |
| SAVOBVMM | VOBVMM Start Address |
| EAVMIFMT | VMIFMT End Address |
| SATSPT | TSPT Start Address |
| SAVMMPGCIBT | VMMPGCIBT Start Address |
| EAVMMPGCIBT | VMMPGCIBT End Address |
| VMMVATR | Video Attribute for Volume Menu |
| VMMNAST | Number of Audio Streams for Volume Menu |
| VMMAATR | Audio stream Attribute for Volume Menu |
| VMMNSPST | Number of Sub-picture Streams for Volume Menu |
| VMMSPATR | Sub-picture stream Attribute for Volume Menu |
| VMMSPPLT | Sub-picture Palettes for Volume Menu |

FIG. 6

| TSP | |
|---|---|
| | Contents |
| TSN | Title Type/Title Set Number |
| PGCN | Program Chain Number |
| SATS | Start Address of Title Set |

FIG. 7

| VMMPGCIBTI | |
|---|---|
| | Contents |
| NVMMLANG | Number of Volume Menu Languages |
| EAVMMPGCIBT | End Address of VMMPGCIBT |

FIG. 9

| VMMLBSP | |
|---|---|
| | Contents |
| VMMLCODE | Volume Menu Language Code |
| SAVMMLB | Start Address of VMMLB |

FIG. 10

| VMMLBI | |
|---|---|
| | Contents |
| EAVMMLB | End Address of VMMLB |
| NTM | Number of Title Menu |
| IVMMPGCITM | Information of VMMPGCI for title Menu |
| NLM | Number of Language Menu |
| IVMMPGCILM | Information of VMMPGCI for Language Menu |

FIG. 11

| VMMPGCI | |
|---|---|
| CFPLSN | Relative Start Address of the Volume Menu contained in a Menu Object |
| SELTSN | Number of Titles which can be selected from the Menu |
| TSN | Seriar Number of the Title Set #1 |
| SATS | Start Address of the Title Set #1 |
| ⋮ | ⋮ |
| TSN | Serial Number of the Title Set #n |
| SATS | Start Address of the Title Set #n |

FIG. 12

| TSISPTI | |
|---|---|
| | Contents |
| NTS | Number of Title Sets |
| EATSISPT | End Address of TSISPT |

| TSISP | |
|---|---|
| | Contents |
| TSCAT | Title Set Category |
| SATSATR | Start Address of TSATR |
| SAVTSMPGCIBT | Start Address of VTSMPGCIBT |
| SAVOBTSM | Start Address of VOBTSM |

TSATR for Video Title Set (VTS)
and Video Title Set Menu(VTSM)

| | Contents |
|---|---|
| VTSVATR | Video Attribute |
| VTSNAST | Number of Audio Streams for VTS |
| VTSAATR | Audio stream Attribute for VTS |
| VTSMNAST | Number of Audio Streams VTSM |
| VTSMAATR | Audio stream Attribute for VTSM |
| VTSNSPST | Number of Sub-picture Streams for VTS |
| VTSSPATR | Sub-picture Attribute for VTS |
| VTSMNSPST | Number of Sub-picture Streams for VTSM |
| VTSMSPATR | Sub-picture Attribute for VTSM |
| VTSSPPLT | Sub-picture Palettes |

F I G. 17

TSATR for Audio Title (ATS)

| | Contents |
|---|---|
| ATSVATR | Video Attribute of Sub-picture |
| ATSNAST | Number of Audio Streams |
| ATSAATR | Audio stream Attribute |
| ATSNSPST | Number of Sub-picture streams |
| ATSSPATR | Sub-picture Attribute |
| ATSSPPLT | Sub-picture Palettes |

F I G. 18

F I G. 19

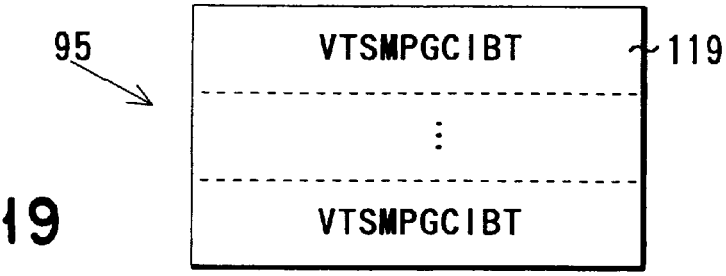

| VTSMPGCIBTI | |
|---|---|
| | Contents |
| NVTSML | Number of Video Title Set Menu Language |
| EAVTSMPGCIBT | End Address VTSMPGCIBT |

| VTSMLBSP | |
|---|---|
| | Contents |
| VTSMLCODE | Video Title Set Menu Language Code |
| SAVTSMLB | Start Address of VTSMLB |

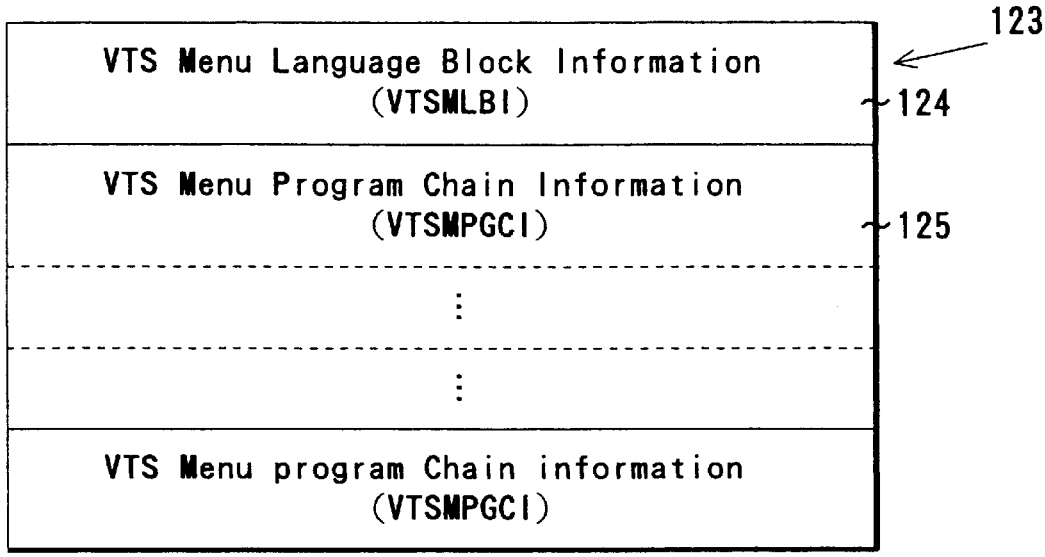

FIG. 23

| VTSMLBI | |
|---|---|
| | Contents |
| EAVTSMLB | End Address of VTSMLB |
| NATM | Number of Author Menu |
| IVTSMPGCIATM | Information of VTSMPGCI for Author Menu |
| NSPM | Number of Sub-Picture Menu |
| IVTSMPGCISPM | Information of VTSMPGCI for Sub-picture Menu |
| NAM | Number of Audio Menu |
| IVTSMPGCIAM | Information of VTSMPGCI for Audio Menu |
| NPGM | Number of Program Menu |
| IVTSMPGCIPGM | Information of VTSMPGCI for Program Menu |

FIG. 24

| VTSMPGI | |
|---|---|
| CFPLSN | relative Start Address of the Menu in the Menu Object |
| SELSPN | Number n of Sub-pictures which can be selected in the Menu |
| SPN | Serial Number of Sub-picture #1 |
| SPN | Serial Number of Sub-picture #n |

FIG. 25

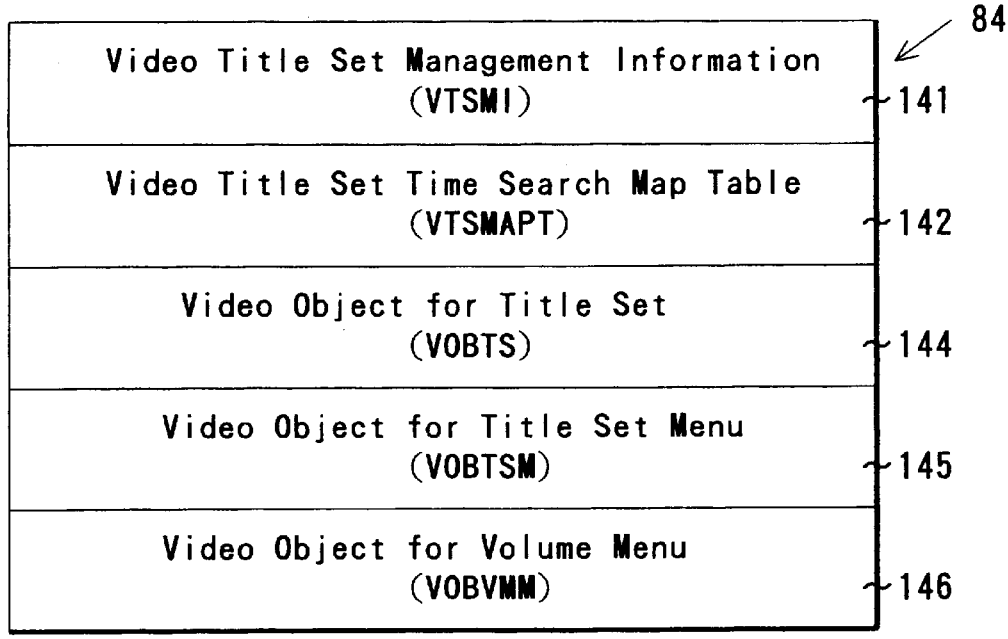
F I G. 28
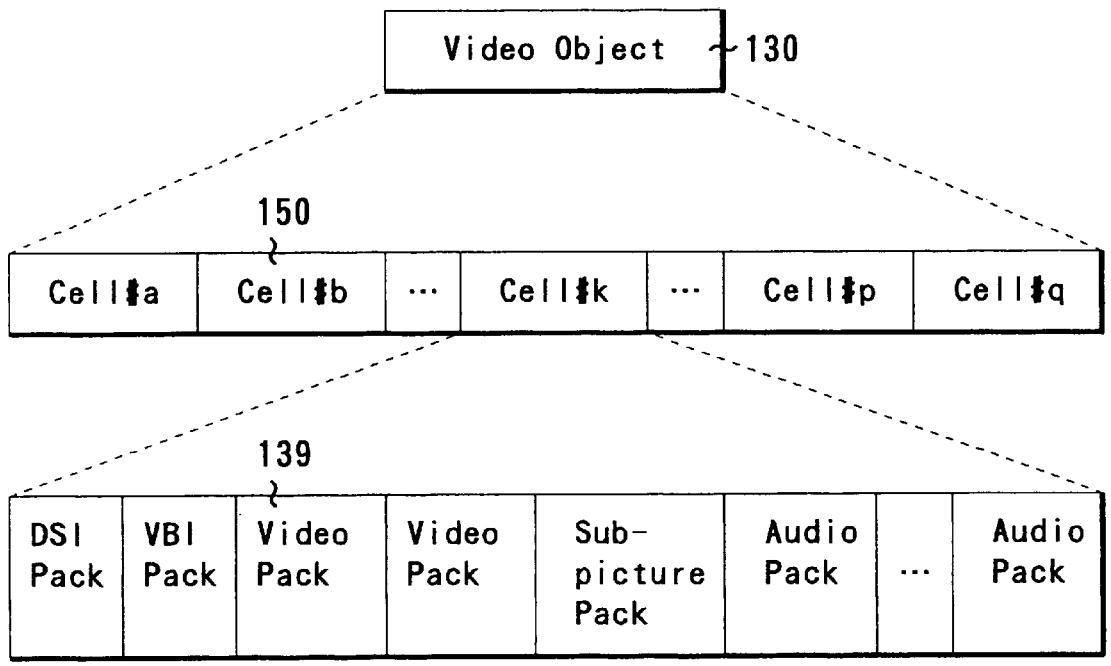
F I G. 29

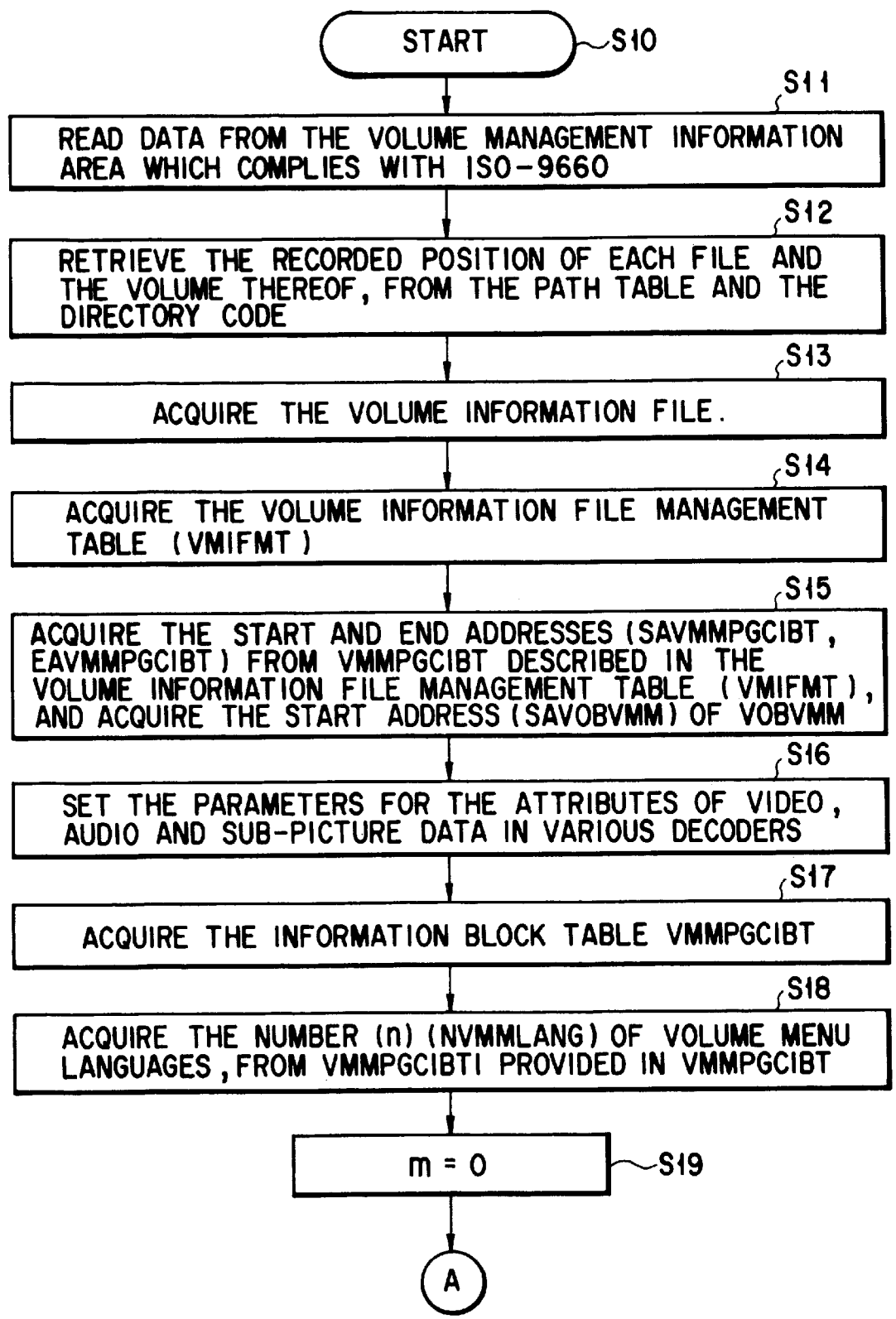
F I G. 30

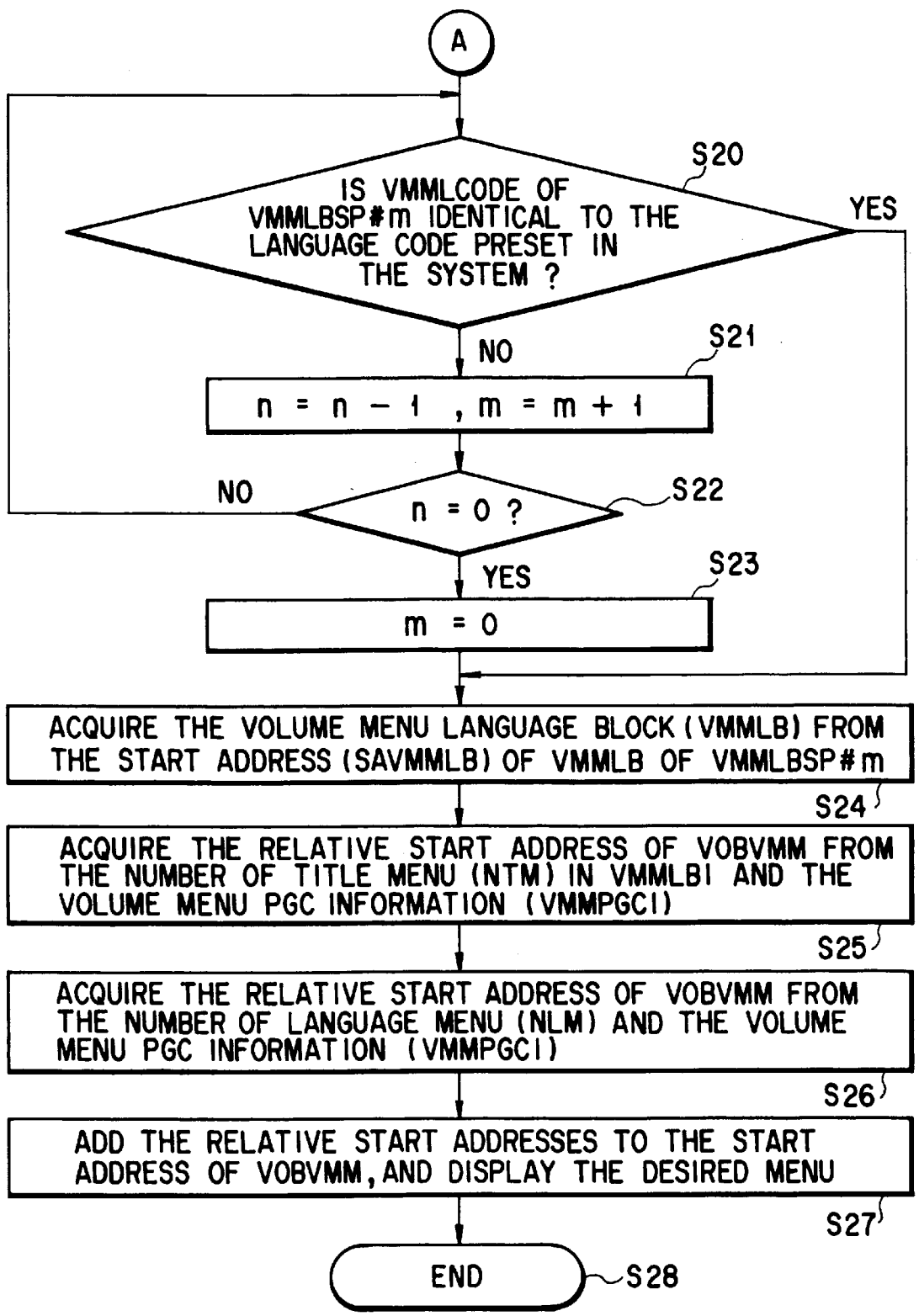
F I G. 31

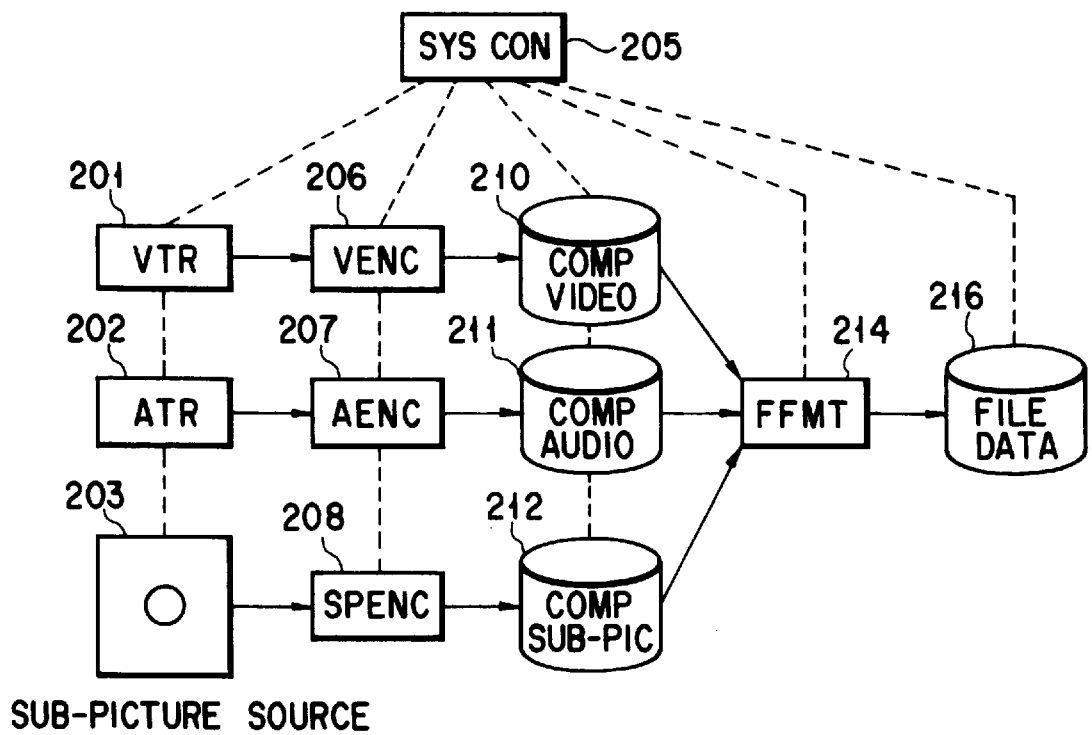
F I G. 35
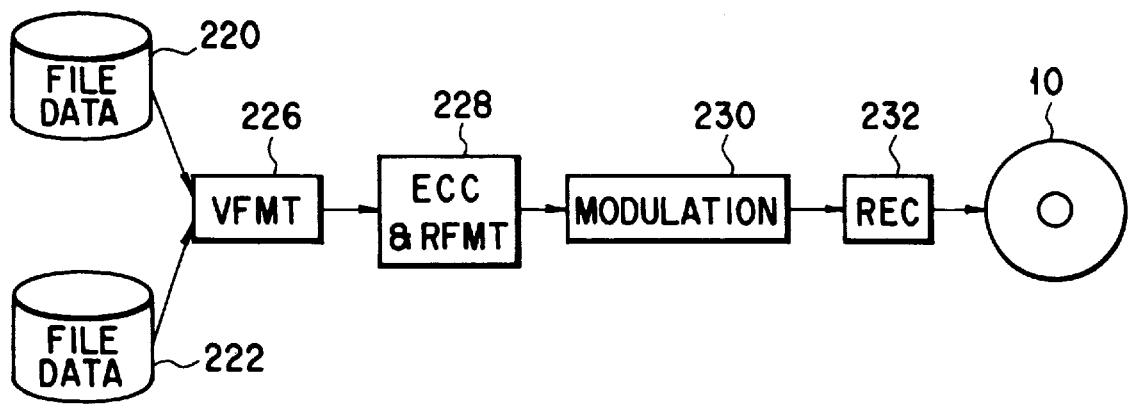
F I G. 38

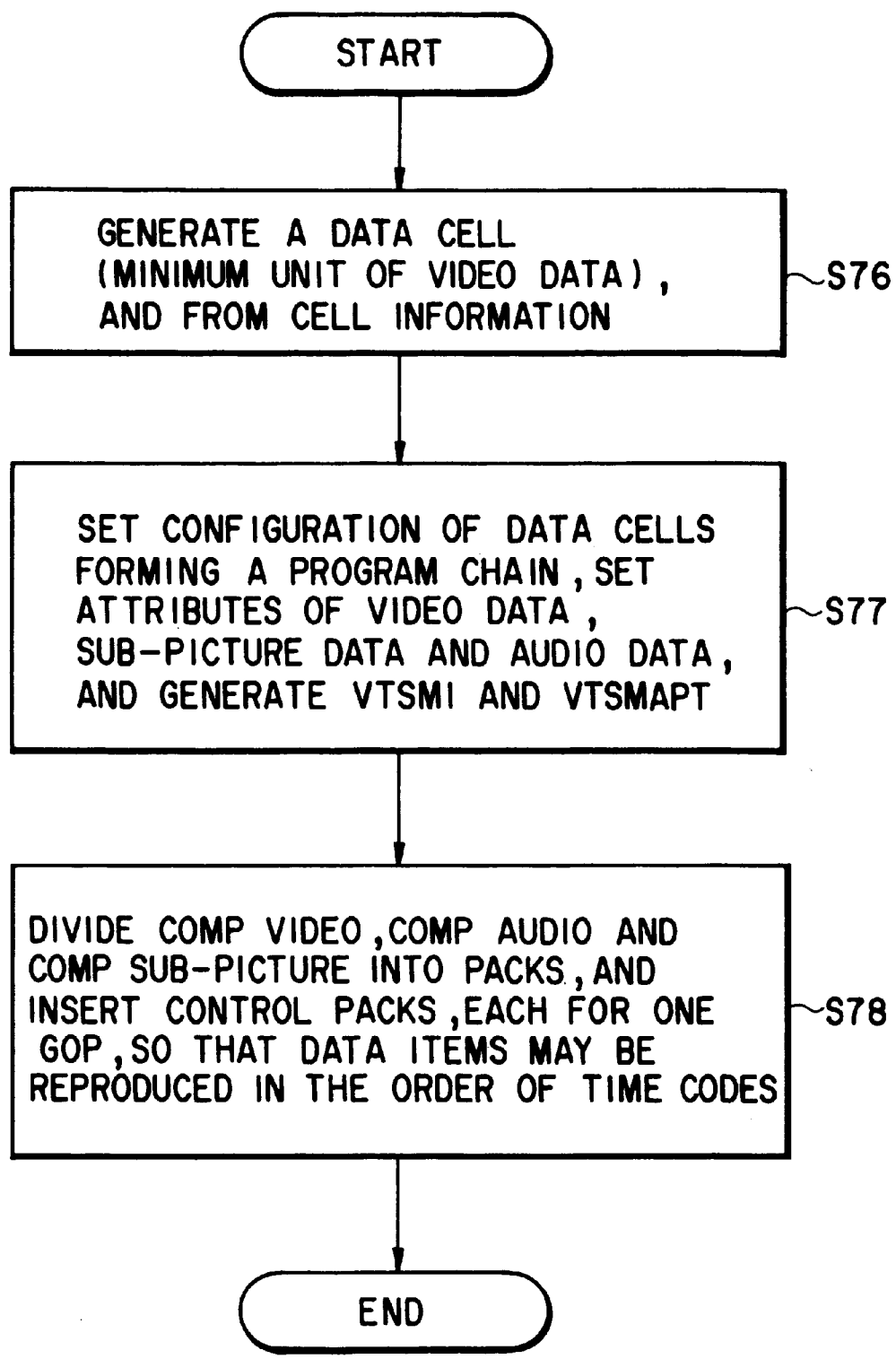
F I G. 37

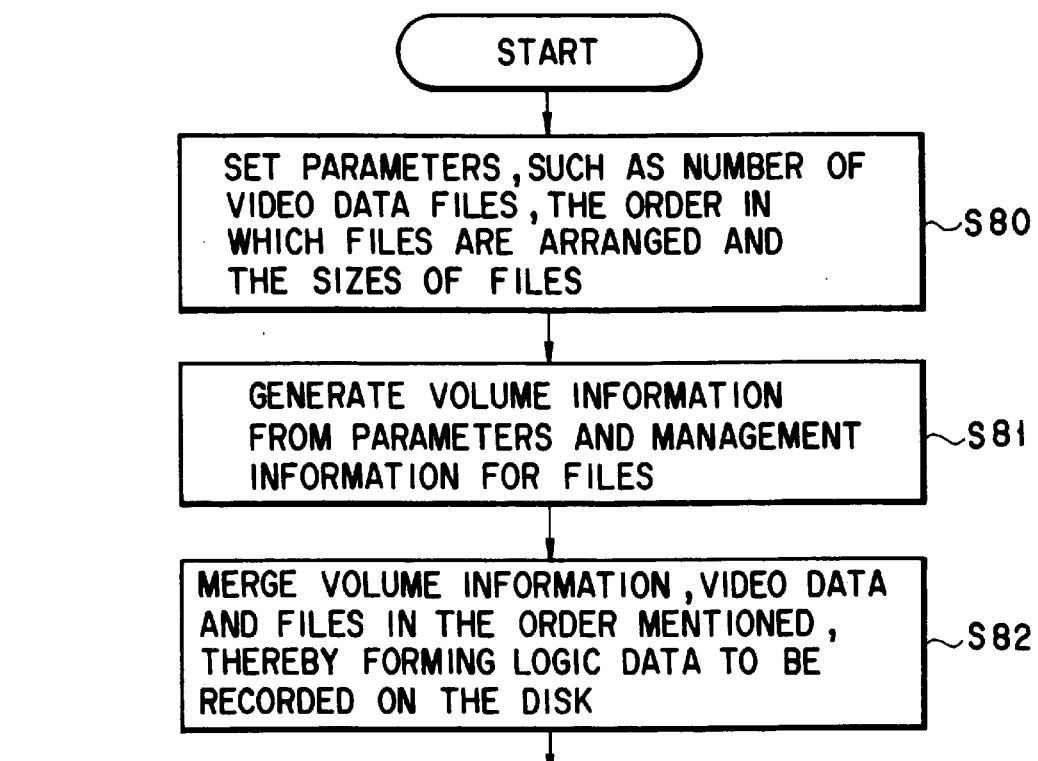
F I G. 39
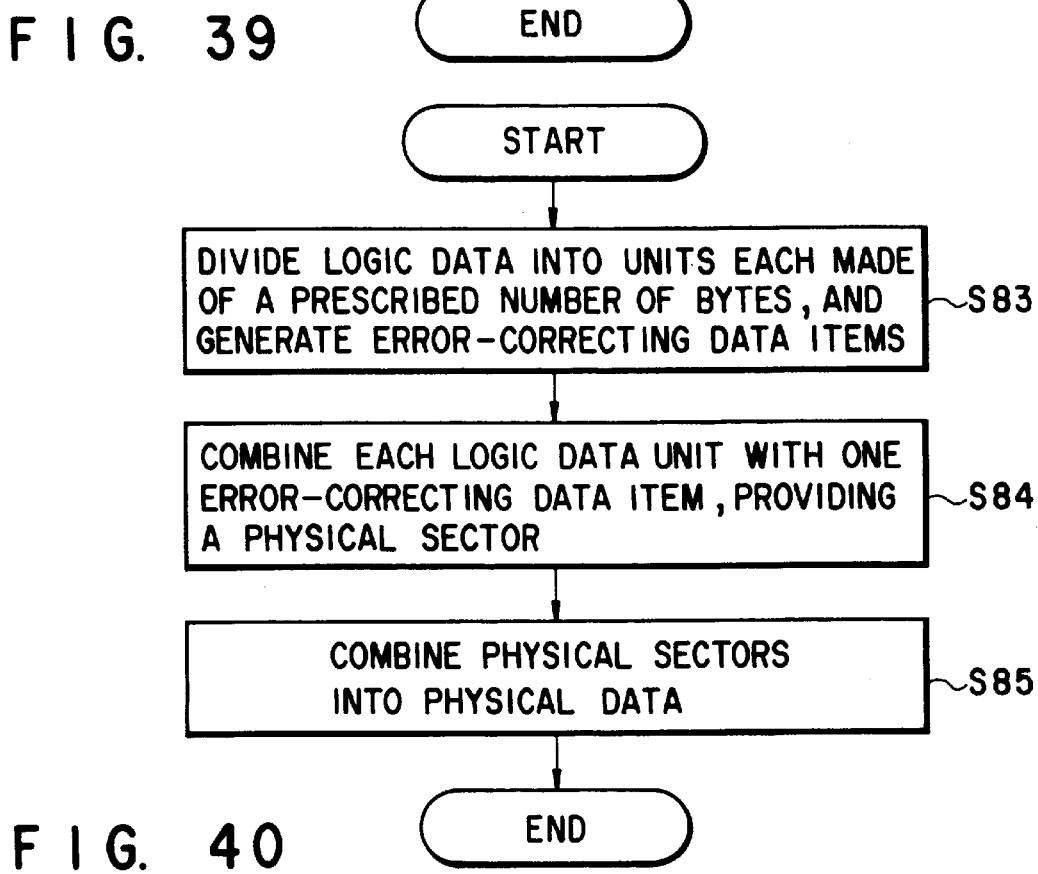
F I G. 40

LARGE-CAPACITY RECORDING MEDIUM, METHOD AND APPARATUS FOR REPRODUCING DATA FROM A LARGE CAPACITY RECORDING MEDIUM, AND METHOD AND APPARATUS FOR RECORDING DATA ON A LARGE-CAPACITY RECORDING MEDIUM

This is a continuation of application No. 08/561,853, filed Nov. 22, 1995, now U.S. Pat. 5,778,142.

BACKGROUND OF THE INVENTION

1. Field of the Invention

The present invention relates to a large-capacity recording medium, a method and apparatus for reproducing information from a large-capacity recording medium, and a method and apparatus for recording information on a large-capacity recording medium. More particularly, it relates to an optical disk on which at least one movie, audio information representing various languages one of which can be selected for the movie, a plurality of sub-pictures and a number of audio streams are recorded, and from which any item of information recorded can be reproduced, to a method and apparatus which reproduce information from such an optical disk, and to a method and apparatus for recording information on an optical disk of high recording density.

2. Description of the Related Art

Optical disks, generally known as compact disks (CDs), have been developed. It is considered difficult to record movie information on or reproduce it from a CD, because of the limited storage capacity of the CD. Researches have been conducted on optical disks of a new type capable of recording movie information at high density. Optical disks are now at development stage.

It is well expected that several movies, not one movie only, can be recorded on an optical disk of the new type, which has a large recording capacity, and that each movie recorded can be played back from in various ways. For instance, an American movie recorded can be played back, not dubbed into any other language. Alternatively, the American movie can be reproduced, dubbed into any other language (e.g., Japanese), along with English subtitles will be superimposed on the images reproduced. Still alternatively, the movie may played back in one of various "versions," which the user has selected; for example, it may be played back, except the violent scenes, if the user does not wish to see such scenes.

To play back a movie from the optical disk in various ways, it is necessary to record various information items representing the movie such that any information item may be selected and reproduced. To select and reproduce one or some movie information items among the may recorded on the optical disk, selection information for use in selecting desired movie information items must be recorded on the optical disk, as well.

The existing CDs comply with the ISO Standards which were made on the assumption that it suffices for an optical disk to have a storage capacity of 4 GB at most. This is why most CDs available at present have a storage capacity of less than 1 GB. Inevitably, data amounting to more than 4 GB cannot be managed by using the conventional optical disk. Large-capacity optical disks have been recently developed, each capable of recording a data item which exceeds 4 GB. It is now demanded that a system be provided which can efficiently manage a data item more massive than 4 GB (e.g., movie information) recorded on a large-capacity optical disk and which can reproduce the data from the optical disk at high speed and in various ways.

SUMMARY OF THE INVENTION

An object of the present invention is to provide a large-capacity recording medium on which are recorded information items at least one of which can be selected, and selection information items for use in selecting at least one of the information items.

Another object of the invention is to provide a method and apparatus for reproducing information from a large-capacity recording medium.

Still another object of this invention is to provide a method and apparatus for recording information on a large-capacity recording medium.

According to an aspect of the invention, there is provided a recording medium with information recorded in high density, comprising: at least one title set area including at least one data file consisting of a plurality of data cells each storing data to be reproduced and a management file storing information for managing an order in which the data cells are to be reproduced; and a volume management area storing information for managing the title set and information about a volume of the recording medium, wherein the data cells of the data file are reproduced in accordance with the information stored in the volume management area, and the data file, the title set area and the volume management area are aligned on a boundary on logical sectors.

According to another aspect of the invention, there is provided an information-reproducing apparatus comprising: reading means for reading volume management information from a recording medium and reading information-reproducing procedure information from the recording medium in accordance with the volume management information, the recording medium having information recorded in high density and comprising at least one title set area including at least one data file consisting of a plurality of data cells each storing data to be reproduced and a management file storing information for managing an order in which the data cells are to be reproduced, and a volume management area storing information for managing the title set and information about a volume of the recording medium, wherein the data cells of the data file are reproduced in accordance with the information stored in the volume management area, and the data file, the title set area and the volume management area are aligned on a boundary between logical sectors; storage means for storing the volume management information read from the recording medium and also the information-reproducing procedure information which the reading means has read from the title set in accordance with the volume management information stored; and output control means for reproducing the data cells in accordance with the information-reproducing procedure information stored in the storage means and for converting the data cells into signals.

According to still another aspect of the invention, there is provided a method of reproducing information, comprising the step of: reading volume management information from a recording medium and reading information-reproducing procedure information from the recording medium in accordance with the volume management information, the recording medium having information recorded in high density and comprising at least one title set area including at least one data file consisting of a plurality of data cells each storing data to be reproduced and a management file storing information for managing an order in which the data cells are to be reproduced, and a volume management area storing information for managing the title set and information about a volume of the recording medium, wherein the data cells of the data file are reproduced in accordance with the information stored in the volume management area, and the data file, the title set area and the volume management area are aligned on a boundary between logical sectors; storing the volume management information reproduced from the recording medium; reading the information-reproducing procedure information from the title set in accordance with the volume management information stored and storing the information-reproducing procedure information; and reproducing the data cells in accordance with the information-reproducing procedure information stored, converting the data cells into signals, and outputting the signals.

According to further aspect of the invention, there is provided an information-recording apparatus comprising: means for generating first file data consisting of a plurality of data cells each containing data, and reproduction management data defining a procedure of reproducing the first file data; means for storing the reproduction management data as second file data and inserting file management data relating to the first file data and the second file data into the second file data, thereby to generate a title set; means for combining information about the title set and information about a volume of the recording medium, thereby to generate a volume file; means for recording the volume file and the title set in a data area of the recording medium, such that the title set will be read after the volume file.

According to still further aspect of the invention, there is provided a method of reproducing information, comprising the step of: generating a first file data consisting of a plurality of data cells each containing reproduction data, and reproduction management data defining a procedure of reproducing the first file data; storing the reproduction management data as a second file data and inserting file management data relating to the first file data and the second file data into the second file data, thereby to generate a title set; combining information about the title set and information about a volume of the recording medium, thereby to generate a volume file; recording the volume file and the title set in a data area of the recording medium, such that the title set will be read after the volume file.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing an optical disk system according to an embodiment of the present invention;

FIG. 2 is a block diagram illustrating in detail the mechanical section of the disk drive section incorporated in the system shown in FIG. 1;

FIG. 3 is a perspective view of the optical disk loaded in the disk drive section shown in FIG. 2;

FIG. 4 is a diagram representing the logic format of the optical disk illustrated in FIG. 3;

FIG. 6 is a table showing the parameters of the volume information file management table (VMIFMT) contained in the volume information file manager (VMIFM) in the volume information file (FIG. 5) and also the contents of these parameters;

FIG. 7 is a table showing the parameters of the title search pointer table (TSPT) contained in the volume information file manager (VMIFM) in the volume information file (FIG. 5) and also the contents of these parameters;

FIG. 9 is a table showing the parameters of the volume menu program chain information block table information (VMMPGCIBTI) contained in the VMMPGCIBT (FIG. 8), and also the contents of these parameters;

FIG. 10 is a table showing the parameters of the volume menu language block search pointer (VMMLBSP) contained in the VMMPGCIBT (FIG. 8), and also the contents of these parameters;

FIG. 11 is a table showing the parameters of the volume menu language block information (VMMLBI) contained in the VMMLB (FIG. 8) in the VMMPGCIBT, and also the contents of these parameters;

FIG. 12 is a table showing the parameters of the volume menu program chain information (VMMPGCI) described in FIG. 11, and also the contents of these parameters;

FIG. 17 is a table showing the parameters of the video title set attribute information described in the TSATRT (FIG. 16);

FIG. 18 is a table showing the parameters of the attribute information of the audio title set (ATS) descried in the TSATR (FIG. 16) contained in the TSATRT (FIG. 5);

FIG. 19 is a diagram depicting the structure of the title set menu program chain information block group (TSMPGCIBTG) contained in the volume information file shown in FIG. 5;

FIG. 23 is a diagram illustrating the structure of the video title set menu language block (VTSMLB) contained in the TSMPGCIBT (FIG. 20), and also the contents of these parameters;

FIG. 24 is a table showing the parameters of the VTSM language block information (VTSMLBI) contained in the VTSMLB (FIG. 23), and also the contents of these parameters;

FIG. 25 is a table showing the parameters of the VTS menu program chain information (VTSMPGI) contained in the VTSMLB (FIG. 23), and also the contents of these parameters;

FIG. 28 is a diagram showing the structure of the video title set shown in FIG. 4;

FIG. 29 is a diagram illustrating the relationship between an video object and cells and the relationship between each cell and various packs;

FIGS. 30 and 31 are a flow chart explaining how a volume menu is displayed;

FIG. 35 is a block diagram of an encoder system designed to encode video data, thereby to form a video data file;

FIG. 37 is a flow chart explaining how to form a video data file by combining the video data, audio data and sub-picture data which the encoder system has generated;

FIG. 38 is a block diagram showing a disk formatter system designed to record a formatted video data file on the optical disk;

FIG. 39 is a flow chart explaining a method of generating logic data to be recorded on the disk, by the disk formatter shown in FIG. 38; and FIG. 40 is a flow chart explaining how to generate physical data from the logic data.

DETAILED DESCRIPTION OF THE PREFERRED EMBODIMENTS

Figure 5:
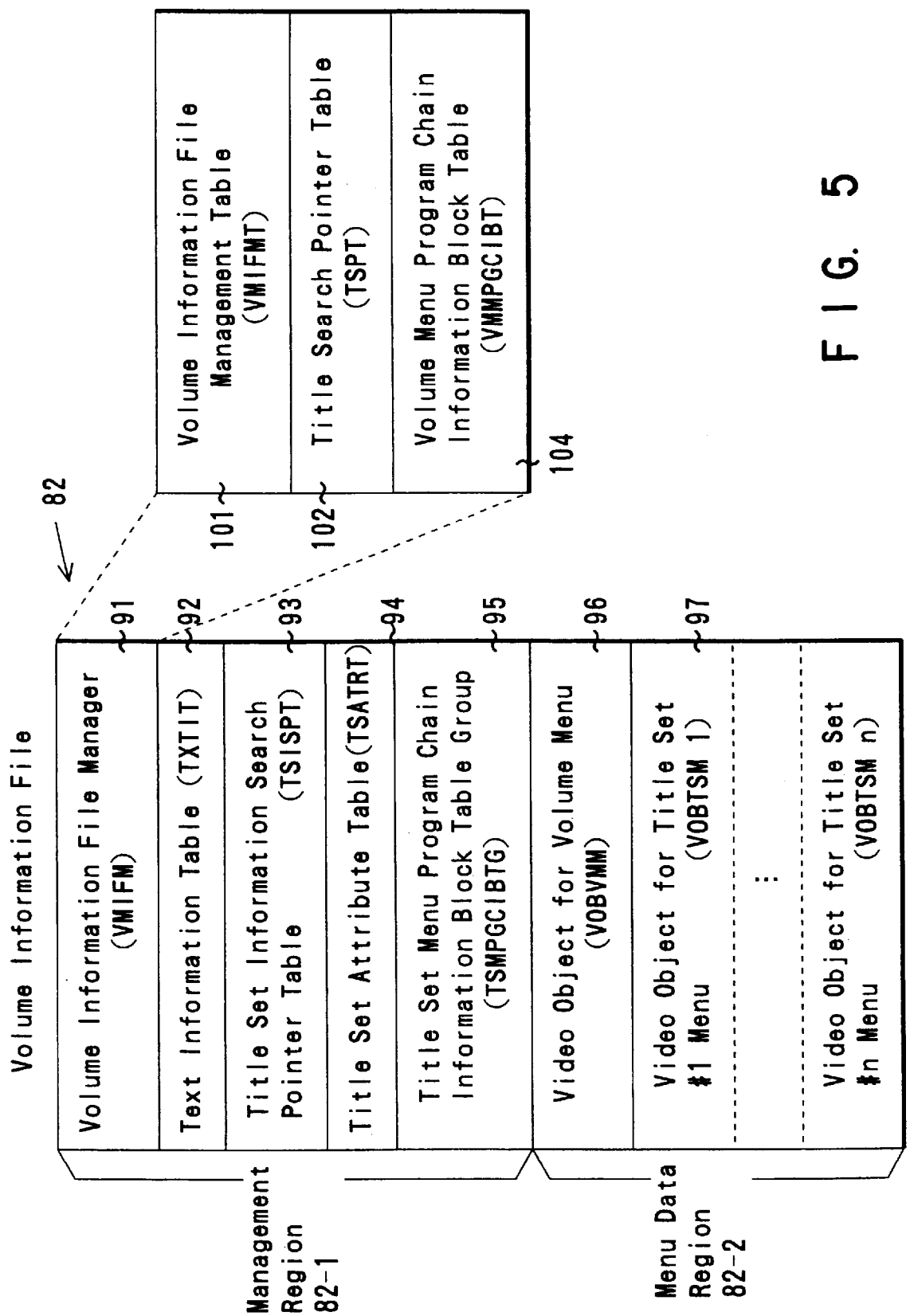
FIG. 5 is a diagram depicting the structure of the volume information file which corresponds to the file 0 included in the logic format shown in FIG. 4.

An embodiment of the present invention will now be described, with reference to the accompanying drawings.

FIG. 1 is a block diagram showing an optical disk system designed which is designed to reproduce data from an optical disk and which is an embodiment of the invention. FIG. 2 is a block diagram showing the disk drive section incorporated in the optical disk system. FIG. 3 shows the optical disk loaded in the disk drive section illustrated in FIG. 2.

As shown in FIG. 1, the optical disk system comprises a key/display section 4, a monitor section 6, and a speaker section 8. When a user operates the key/display section 4, the data recorded on an optical disk 10 is reproduced. The data includes video data, sub-picture data and audio data, which are converted into video signals and audio signals. The video signals are supplied to the monitor section 6, and the audio signals to the speaker section 8. The monitor section 6 displays the images represented by the video signals. The speaker section 8 generates the sound represented by the audio signals.

As known in the art, there are optical disks of various structures. The optical disk 10 is, for example, a read-only disk shown in FIG. 3 which has been recently developed and on which data is recorded in high density. As shown in FIG. 3, the optical disk 10 comprises a pair of composite layers 18 and an adhesive layer 20 interposed between the composite disk layers 18. Each disk layer 18 consists of a transparent substrate 14 and a light-reflecting layer (i.e., a recorded layer). The disk layers 18 are positioned such that the light-reflecting layers 16 contact the surfaces of the adhesive layer 20. The optical disk 10 has center hole 22. The disk 10 also has two annular clamping areas 24 on both surfaces, each around the hole 22. It is in the center hole 22 that the spindle of a spindle motor 12 shown in FIG. 2 will be inserted when the disk is loaded in the optical disk system. It is at the clamping area 24 that the disk 10 remains clamped while it is spinning.

As shown in FIG. 3, too, the optical disk 10 has two annular data-recording areas 25 on both surfaces, each around the clamping area 24. Each data-recording area 25 is comprised of a lead-out area 26, a lead-in area 27, and a recorded area 28. The lead-out area surrounds the clamping area 24 and is surrounded by the recorded area 28, which in turn is surrounded by the lead-out area 26. No data is recorded in the lead-out areas 26 and the lead-in areas 28 in most cases.

Each light-reflecting layer 16 has a track on its outer surface. The track is a continuous spiral track, as in most optical disks of this type. The track is divided into a plurality of sectors. Data is recorded in units, each in one sector. The track corresponds to the recorded area 28, in which management data, video data, sub-picture data and audio data are recorded in the form of pits (i.e., physical changes). Since the optical disk 10 is a read-only one, a spiral train of pits has been formed by a stamper in the surface of each transparent substrate 14. On the surface of the transparent substrate 14 there has been vapor-deposited the light-reflecting layer 16, which serves as a recorded layer 16. No groove (for a track) is formed in the surface of the transparent substrate 14, and only a train of pits is formed as a track in the surface of the transparent substrate 14. This is because the optical disk 10 is a read-only disk.

As shown in FIG. 1, the optical disk system further comprises a disk drive section 30, a system CPU section 50, a system ROM/RAM section 52, a system processor section 54, a data RAM section 56, a video decoder section 58, a audio decoder section 60, a sub-picture decoder section 62, and a D/A and data-reproducing section 64.

As shown in FIG. 2, the disk drive section 30 has a motor drive circuit 11, the spindle motor 12, an optical head 32 (i.e., an optical pickup), a feed motor 33, a focusing circuit 36, a feed motor drive circuit 37, a tracking circuit 38, a head amplifier 40, and a servo processing circuit 44. The optical disk 10 is mounted on the spindle motor 12, which is to be driven by the motor drive circuit 11 and is rotated by the spindle motor 12. The optical head 32 is located below the optical disk 10, for applying a laser beam onto the disk 10. The optical head 32 is mounted on a guide mechanism (not shown). The feed motor drive circuit 37 is provided to supply a drive signal to the feed motor 33. The motor 33 is to driven by the drive signal to move the optical head 32 in the radial direction of the disk 10. The optical head 32 has an objective lens 34 which faces the optical disk 10. The objective lens 34 can be moved along its optical axis in accordance with a driven signal supplied from the focusing circuit 36.

To reproduce the data from the optical disk 10 described above, the optical head 32 applies a laser beam onto the optical disk 10 through the objective lens 34. The lens 34 is minutely moved in the radial direction of the disk 10 in accordance with a drive signal supplied from the tracking circuit 38. The lens 34 is also minutely moved along its optical axis in accordance with a drive signal supplied from the focusing circuit 36, such that its focal point is located at the recorded layer 16 of the disk 10. Therefore, the laser beam forms the smallest beam spot on spiral track (i.e., the train of pits) and the spiral track is traced by the laser beam spot. The laser beam is reflected from the recorded layer 16 and applied back to the optical head 32. The head 32 converts the beam into an electric signal, which is supplied via the head amplifier 40 to the servo processing circuit 44. The circuit 44 generates a focusing signal, a tracking signal and a motor control signal, which are supplied to the focusing circuit 36, the tracking circuit 38 and the motor drive circuit 11, respectively.

The objective lens 34 is thereby moved along its optical axis and in the radial direction of the disk 10, having its focal point located at the recorded layer 16 of the disk 10. The laser beam forms the smallest beam spot on spiral track. In the meantime, the motor drive circuit 11 drives the spindle motor 12, which in turn rotates the optical disk 10 at a predetermined speed. As a result, the beam spot tracks the spiral train of the pits at, for example, a constant linear speed.

Meanwhile, the system CPU section 50 (FIG. 1) supplies a control signal (or an access signal) to the servo processing circuit 44. Upon receipt of the control signal the servo processing circuit 44 supplies a head-moving signal to the feed motor drive circuit 37, which supplies a drive signal to the feed motor 33. The feed motor 33 is thereby driven, moving the optical head 32 in the radial direction of the optical disk 10. The optical head 32 has access to a specified one of the sectors formed on the recorded layer 16 of the disk 10. The data is thereby reproduced from the specified sector, supplied from the head 32 to the head amplifier 40, amplified by the amplifier 40, and output from the disk drive section 30.

The data reproduced is supplied to the data RAM section 56 through the system CPU section 50 and the system processor section 54. The section 50 is controlled by the programs stored in the system ROM/RAM section 52. The system processor section 54 processes the data into video data, audio data and sub-picture data. The video data, the audio data and the sub-picture data are supplied to the video decoder section 58, the audio decoder section 60 and the sub-picture decoder section 62 and decoded by these decoder sections 58, 60 and 62, respectively. The D/A and data-reproducing section 64 converts the vide data, the audio data and the sub-picture data, all decoded, to a video signal, an audio signal and a sub-picture signal which are analog signals. These signals are mixed in the D/A and data-reproducing section 64. The video signal and the sub-picture signal are supplied to the monitor section 6, and the audio signal to the speaker section 8. The monitor section 6 displays an image generated from the video signal and the sub-picture signal. The speaker section 8 generates the sound represented by the audio signal.

The operation of the optical disk system (FIG. 1) will be explained later in more detail, with reference to the logic format of the optical disk 10.

The recorded area 28 of the optical disk 10, provided between the lead-out area 26 and the lead-in area 27, has the volume and file structure shown in FIG. 4. This structure complies with specific logic format standards, such as Micro UDF and ISO 9660. As seen from FIG. 4, the volume and file structure has a directory structure and consists of a volume management information area 70 and, a file area 80 which includes, a volume information file 82, video title sets 84 and/or audio title sets 86. These areas, files and title sets are aligned on the boundary between logical sectors. The volume management information 70 stores contents which are defined in the above described standard. The file area 80 stores video data, audio data, and data for managing the video data and the audio data. That is, the video title set 84 stores video, audio and sub-picture data, the audio title set stores audio data and the file 82 stores management data related to the video and audio title sets.

The volume management information area 70 is equivalent to the root directory which has been prepared in compliance with both Micro UDF and ISO 9660. Described in the area 70 are a path table and directory codes. The video title sets 84 and the audio title sets 86 exist in the root directly and have directory names assigned to them. Each of video title sets 84 consists of a plurality of video files 88, and each audio title set 86 consists of a plurality of audio files 88. Each of the video and audio files 88 has a size not exceeding 1 GB ($2^{30}$ bytes). Each of the title sets 84 and 86 consists of at least one files 88, maximum ten files, and therefore has a size equal of at least 1 GB or more, maximum 10 GB.

The volume information file 82, which is read out through the volume management information area 70 in which the path table and directory codes are described, has regions, as shown in FIG. 5, each region being aligned on the boundary between logical sectors. More specifically, the volume information file 82 is divided into two main regions, i.e., a management region 82-1 and a menu data region 82-2. The region 82-1 comprises one file manager, three tables and one table group, which are provided for managing the entire volume information file. The region 82-2 comprises of one menu and one menu group, which are provided for forming a menu by using video, audio and sub-pictures or the like. To be more precise, the management region 82-1 is formed of a volume information file manager (VMIFM) 91, a text information table (TXTIT) 92, a title set information search pointer table (TSISPT) 93, a title set attribute table (TSATRT) 94, and title set menu program chain information block table group 95 (TSMPGCIBTG), while the menu data region 82-2 is formed of a video object (VOBVMM) 96 for the volume menu and a video object (VOBTSM) for the first to n-th title sets #1 to #n. As will be described later, video data, sub-picture data and audio data which constitute a menu are stored in the video object (VOBVMM) 96 and each of the video objects (VOBTSMS) 1 to n) 97.

The menu data region 82-2 comprises audio objects in addition to the video objects 96 and 97. Of these audio objects, some are used as audio data items for title set menus, some other are used as video data items for playing back the stories of the titles stored in the title sets 84 and 86, and the remaining ones are used as audio data items for playing back tunes of various title.

The volume information file 82 has a file size not exceeding 1 GB. The volume information file manager (VMIFM) 91 of the volume information file 82 is referred to, in order to acquire the title sets 84 and 86.

As shown in FIG. 5, the volume information file manager (VMIFM) 91 consists of three tables, i.e., a volume information file management table (VMIFMT) 101, a title search pointer table (TSPT) 102, and a volume menu program chain information block table (VMMPGCIBT) 104, each table being aligned on the boundary between logical sectors.

In the volume information file management table (VMIFMT) 101 there are described various information items concerning the volume information file 82. Among these information items are: a volume information file identifier (VMIFID); the size of the volume information title, which is described as number of logical sectors; the start and end addresses of each table; and attribute information provided on the video object (VOBVMM) 96 for the volume menu and representing the attributes of the video, audio data and sub-picture data for the volume menu. To be more specific, the identifier (VMIFID) identifying the volume information file, the size (SZVMIF) expressing the size of the volume information file in terms of the number of sectors, and volume category (VMCAT) indicating whether the data of this volume can be copied or not. Also described in the volume information file management table (VMIFMT) 101 are: the start address (SATXTIT) of the text information table (TXTIT) 92; the start address (SATSISPT) of the title set information search pointer table (TSISPT) 93; the start address (SATSATRT) of the title set attribute table (TSATRT) 94; the start address (SATSMPGCIBTG) of the title set menu program chain information block table group (TSMPGCIBTG) 95; and the start address (SAVOBVMM) of the video object (VOBVMM) 96 for the volume menu.

Further described in the volume information file management table (VMIFMT) 101 are: the end address (EAVMIFMT) of the volume information file management table (VMIFMT) 101; the start address (SATSPT) of the title search pointer table (TSPT) 102; the start address (SAVMMPGCIBT) of the volume menu program chain information block table (VMMPGCIBT) 104; the end address (EAVMMPGCIBT) of the volume menu program chain information block table (VMMPGCIBT) 104. Still further described in the volume information file management table (VMIFMT) 101 are: the video attribute (VMMVATR) for the volume menu, such as the attribute of the video compression mode; the number (VMMNAST) of the audio streams for the volume menu; the audio stream attribute (VMMAATR) for the volume menu, such as the attribute of the audio coding mode; the number (VMMNSPST) of the sub-pictures or the volume menu; the sub-picture stream attribute (VMMSPATR) for the volume menu, such as the attribute of the sub-picture coding mode; and the sub-picture palettes (VMMSPPLT) for the volume menu. In the volume information file management table (VMIFMT) 101, start addresses and end addresses are almost expressed as the relative logic sector numbers, each indicating the position which one logic sector assumes with respect to the first logic sector of the volume information file 82. However, start addresses (SATSPT, SAVMMPGCIBT, EAVMMPGCIBT) are expressed as the relative logical bytes. If no start addresses exist in the table (VMIFMT) 101, this fact is described.

Described in the title search pointer table (TSPT) 102 is search information for setting any title that the user has input by operating a remote controller, i.e., the key/display section 4. The search information is concerned with the selection of a program chain which corresponds to the number the user has input by operating the remote controller. In the title search pointer table (TSPT), there are described the number of titles which can be selected, title set number corresponding to a number which is selected and input by the user, program chain number for executing a reproduction control, and the start address of the title set. More specifically, as shown in FIG. 7, a title type/title set number TSN, a program chain number (PGCN), and the start address (SATS) of the title set selected are described in the title search pointer table (TSPT) 102. The number (TSN) represents the type of the title selected, either a video title or an audio title, or the number assigned to the title selected. The program chain number PGCN is the number assigned to the program selected first by the user.

In the volume menu program chain information block table (VMMPGCIBT) 104, there is described volume menu program chain information (VMMPGI) for generating volume menus for various languages. In other words, this table (VMMPGCIBT) 104 contains the title menus for selecting one of the titles available, each menu for one language (e.g., English, German, or Japanese), and also control information required to playback and select a language menu for use in selecting a language. The word "program chain" means a sequence of steps for playing back a video tile, an audio title, a video title set menu and a volume menu, which will be explained later with reference to FIG. 28. Stated in another way, a program chain (PGC) is a group of selected programs for achieving a sequence or story. More correctly, the program chain (PGC) consists of a program or programs, each made up of one or more selected data cells. The programs forming a program chain (PGC) have ordinal numbers 0 to i assigned to them.

Figure 8:
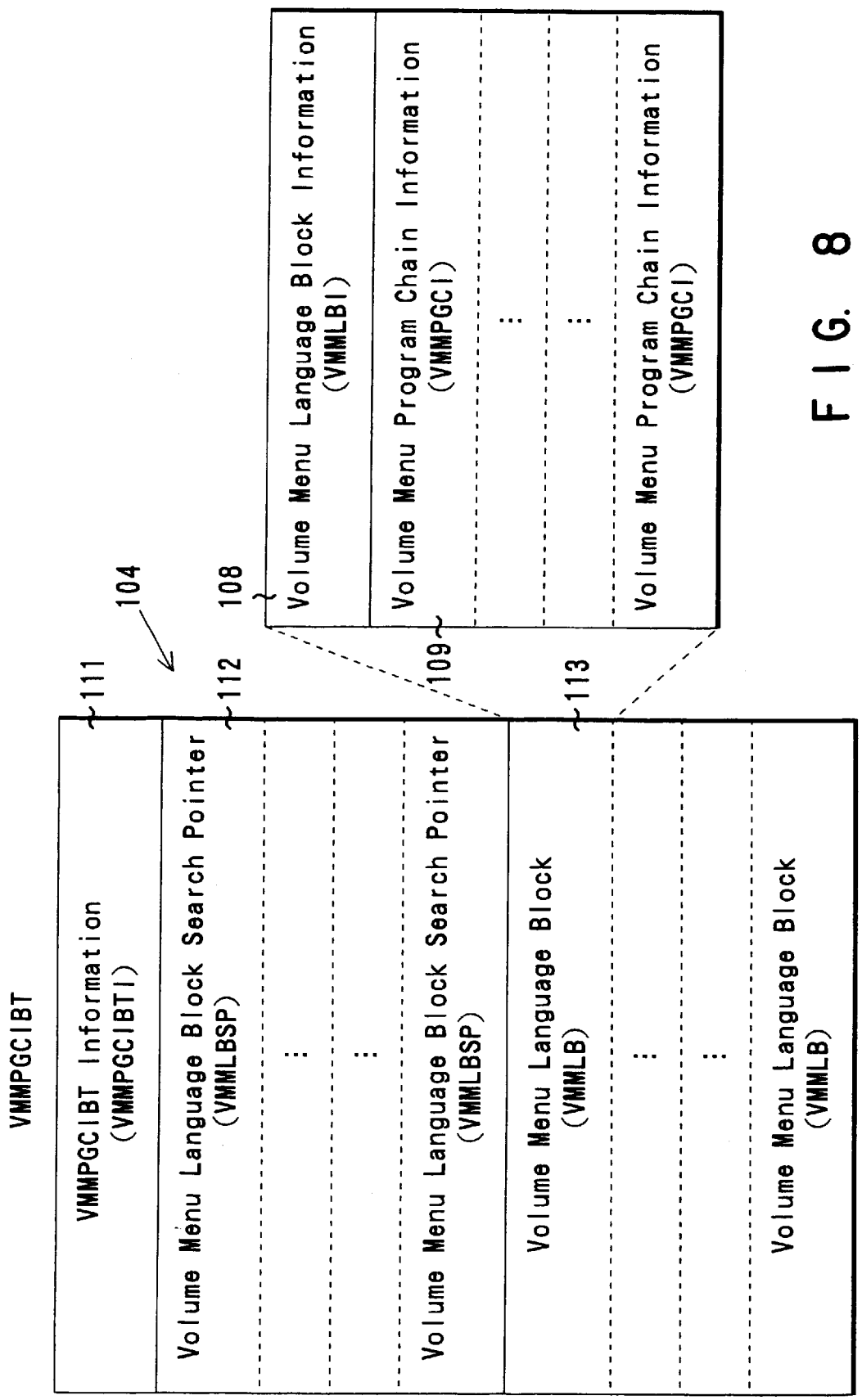
FIG. 8 is a table showing the parameters of the volume menu program chain information block table (VMMPGCIBT) included in the volume information file (FIG. 5) and also the contents of these parameters.

As shown in FIG. 8, described in the volume menu program chain information block table (VMMPGCIBT) 104 are: the information (VMMPGCIBTI) 111 concerning the table (VMMPGCIBT) 104; volume menu language block pointers (VMMLBSPs) 112 provided for the languages contained in this volume; and volume menu language blocks (VMMLBs) 113 provided for the languages contained in this volume 104. The information (VMMPGCIBTI) 111 consists of the number of volume menu languages (NVMMLANG) and the end address of the table (VMMPGCIBT) 104, as is illustrated in FIG. 9. Each volume menu language block pointer (VMMLBSP) 112 consists of the volume menu language code (VMMLCODE) for the language designated by the pointer (VMMLBSP) 112 and the start address (SAVMMLB) of the volume menu language block (VMMLB) 113 corresponding to the language code (VMMLCODE), as shown in FIG. 10.

As shown in FIG. 8, each volume menu language block (VMMLB) 113 is constituted by a volume menu language information (VMMLBI) 108 and a volume menu program chain information (VMMPGCI) 109 for one language. As seen from FIG. 11, in the volume menu language block (VMMLB) 113 there are described the end address (EAVMMLB) of the language block (VMMLB) 113, the number of the title menu (NTM) of the language block (VMMLB) 113, the information (IVMMPGCITM) (such as the start address) of the volume menu program chain information (VMMPGCI) for the title menu which can be expressed in the language, the number of the language menu (NLM), and the information (IVMMPGCILM) (such as the start address) of the volume menu program chain information (VMMPGCI) for the language menu.

As shown in FIG. 12, described in the menu program chain information (VMMPGCI) are: the relative start address (CFPLSN) of the volume menu contained in a menu object; the number (SELTSN) of titles (i.e., sub-pictures) which can be selected from the menu; the serial numbers (TSNs) of the title sets #1 to #n; and the start addresses (SATSs) of the title sets #1 to #n (i.e., the numbers (SPNs) of the first to n-th sub-picture streams).

In the text information table (TXTIT) 92 shown in FIG. 5, various information items about the titles compiled in the volume, such as the names of the titles (albums), the performers' names, the producers' name, the dates of production, are described in the form of text data. The text information table (TXTIT) can be utilized in personal computers of general type.

Figures 13, 14, 15, 16:
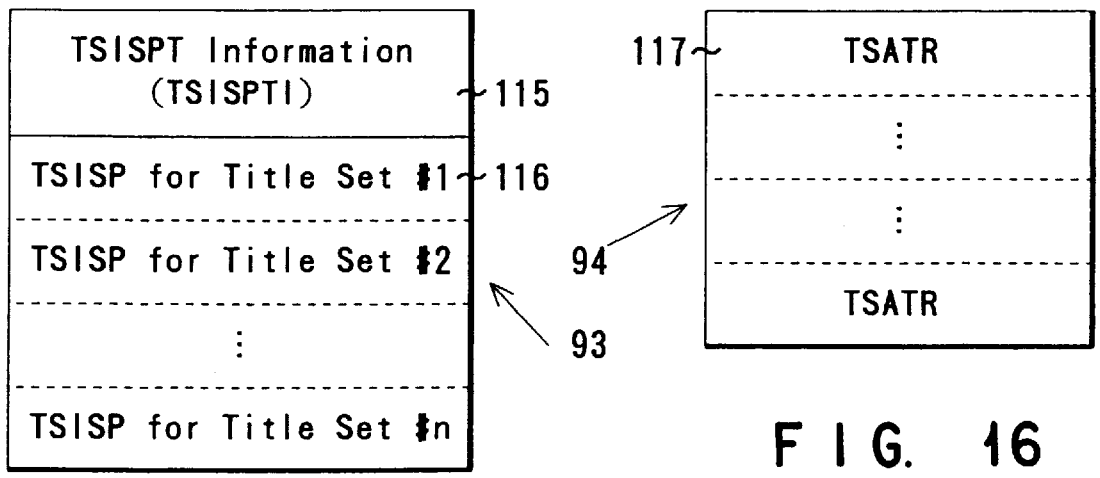
FIG. 13 is a diagram representing the structure of the title set information search pointer table (TSISPT) included in the volume information file (FIG. 5)
FIG. 14 is a table showing the parameters of the title set information search pointer table (TSISPTI) shown in FIG. 13 contained in the TSISPT (FIG. 5), and also the contents of these parameters.
FIG. 15 is a table showing the parameters of the title set information search pointer (TSISP) contained in the TSISPTI (FIG. 13) contained in the TSISPT (FIG. 5), and also the contents of these parameters.
FIG. 16 is a diagram showing the structure of the title set attribute table (TSATRT) contained in the volume information file shown in FIG. 5.

The title set information search pointer table (TSISPT) 93 shown in FIG. 5, too, provides information items about the menu prepared in each title set compiled in the volume. Among these information items are: the menu of the title set; the start address in the attribute table for the title set; the start address in the program chain block table for the title set menu; and the start address of the video object for the title set menu. More precisely, in the title set information search pointer table (TSISPT) 93, the information (TSISPTI) of the title set information search pointer table (TSISPT) and the title set information search pointers (TSISPS) of the title sets 1 to #n are described as illustrated in FIG. 13. The information (TSISPTI) of the table (TSISPT) includes the number of title sets (NTS) and the end address of this information (TSISPTI) as illustrated in FIG. 14. In the title set information search pointer (TSISP), there are described the title set category (TSCAT), the start address (SATSATR) of the title set attribute table (TSATRT) 94, the start address (SAVTSMPGCIBT) of the title set menu program chain information block table group (TSMPGCIBTG) 95, and the start address (SAVOBTSM) of the title set video object (VOBTSM) are for the title set, as illustrated in FIG. 15.

The title set attribute table (TSATRT) 94 shown in FIG. 5 provides the titles compiled in the volume and the attribute information of the title menu. The number of each stream made of video data, audio data and sub-picture data, and the information representing the attributes of the stream (such as the compression mode and data configuration) are described in the title set menu program chain information block table group (TSMPGCIBTG) 95. State more precisely, the title set attributes (TSARTs) 117 are described for the title sets as shown in FIG. 16, and the parameters shown in FIG. 17, for the attributes of each video title set (VTS) and each video title set menu (VTSM) are described in each title set attribute (TSART) 117. These parameters are: video attribute (VTSVATR); number of audio streams (VTSNAST) for the video title set (VTS); audio stream attributes (VTSAATR) for the video title set (VTS); number of audio steams (VTSMNAST) for the video title set menu (VTSM); audio stream attribute (VTSMAATR) for the video title set menu (VTSM); number of sub-picture streams (VTSNSPST) for the video title set (VTS); sub-picture attribute (VTSSPATR) for the video title set (VTS); number of sub-picture streams (VTSMNSPST) for the video title set menu (VTSM); sub-picture attribute (VTSMSPATR) for the video title set menu (VTSM); and sub-picture palettes (VTSSPPLT).

For the attribute information of each audio title set (ATS), parameters are described in each title set attribute (TSATR) 117 as shown in FIG. 18. These parameters are: the video attribute (ATSVATR) of the sub-picture; number of audio streams (ATSNAST); audio stream attribute (ATSSPAATR); number of sub-pictures (ATSNSPST), sub-picture attribute (ATSSPATR); and sub-picture palettes (ATSSPPLT).

The title set menu program chain information block table group (TSMPGCIBTG) 95 shown in FIG. 5 is a group of title set menu program chain information block tables (TSMPGCIBTS) 119 provided for the video title sets (VTSs), as is illustrated in FIG. 19. Each block table (TSMPGCIBT) 119 serves to select and play back the video object listed in the title set menu prepared in the volume.

Described in the block table (TSMPGCIBT) 119 are the number of languages provided for each title, the codes for these languages, the number of menus for each language (e.g., sub-picture, audio, angle and program), and control data for playing back these menus.

To be more specific, the information of the video title set menu program chain (VTSMPGC) for playing back the video title set (VTS) in various languages is described in each title set menu program chain block table (TSMPGCIBT) 119. Namely, in each title set menu program chain block table (TSMPGCIBT) 119 there are described, as shown in FIG. 20, a video title set menu program chain information block table information (VTSMPGCIBTI) 121, video title set menu language block search pointers (VTSMLBSPs) 122 for the various languages, and video title set menu language blocks (VTSMLBs) 123 for the various languages.

Figures 20, 21, 22:
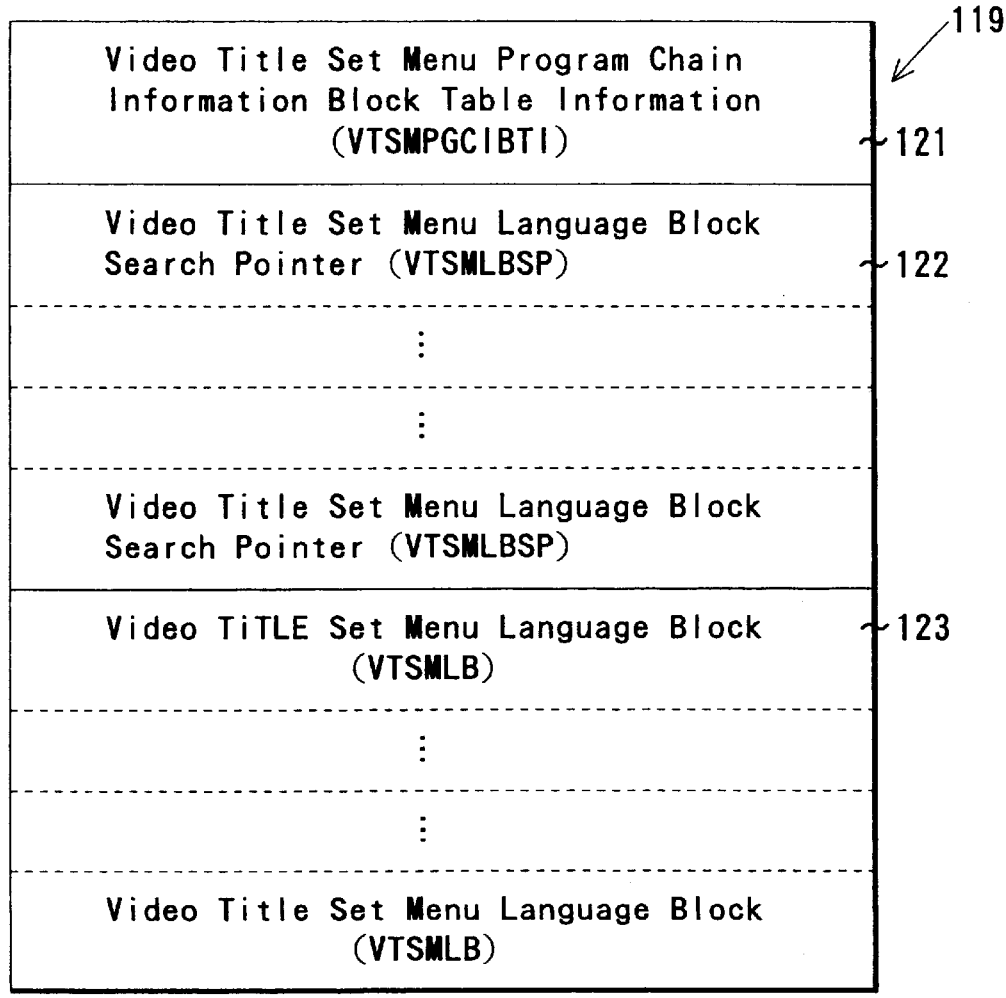
FIG. 20 is a diagram depicting the structure of the title set menu PGC block table (TSMPGCIBT) contained in the volume information file shown in FIG. 5.
FIG. 21 is a table showing the parameters of the video title set menu program chain information block table information (VTSMPGCIBTI) contained in the TSMPGCIBT (FIG. 20), and also the contents of these parameters.
FIG. 22 is a table showing the parameters of the VTSM language block search pointer (VTSMLBSP) contained in the TSMPGCIBT (FIG. 20), and also the contents of these parameters.

As shown in FIG. 21, the number of video title set menu language (NVTSML) and the end address (EAVTSMPGCIBT) of the block table information (VTSMPGCIBTI) 121 are described in the video title set menu program chain information block table information (VTSMPGCIBTI) 121. As shown in FIG. 22, the video title set menu language code (VTSMLCODE) and the start address (SAVTSMLB) of the VTSM language block search pointers (VTSMLBSP) 122 are described in each of the video title set menu language block search pointers (VTSMLBSPs) 122.

Each of the video title set (VTS) menu language blocks (VTSMLBs) 123 is provided for one language. As shown in FIG. 23, VTS menu language block information (VTSMLBI) 124 and VTS menu program chain information items (VTSMPGCIs) 125 are described in the VTS menu language block (VTSMLB) 123. AS shown in FIG. 24, described in the VTS menu language block information (VTSMLBI) 124 are: the end address (EAVSMLB) of the VTS menu language block (VTSMLB) 123; the number of author menu (NATM); the information (IVTSMPGCIATM) of VTSMPGCI for the author menu; the number of sub-picture menu (NSPM); the information (IVTSMPGCISPM) of VTSMPGCI for the sub-picture menu; the number of audio menu (NAM); the information (IVTSMPGCIAM) of VTSMPGCI for the audio menu; the number of program menu (NPGM); and the information (IVTSMPGCIPGM) of VTSMPGCI for the program menu. As illustrated in FIG. 25, described in the VTS menu program chain information items (VTSMPGCIs) 125 are: the relative start address (CFPLSM) of the menu provided in the menu object; the number n (SELSPN) of sub-pictures which can be selected in the menu; and the serial numbers (SPNs) of sub-picture steams #1 to #n.

As indicated above, the menu data region 82-2 shown in FIG. 5 has the video object (VOBVMM) 96 for the volume menu and the video object (VOBTSM) for the title set menu. Stored in the video object (VOBVMM) 96 are data items constituting a title menu which is used to select one title and which is expressed in a specific language, and data items constituting a language menu which is used to select a desired language for the title selected. Stored in the video object (VOBTSM) are as many menu blocks as the title sets available, each block consisting of data items constituting a menu which is expressed in in each language and which is used to select a sub-picture, audio data and program.

Figure 26:
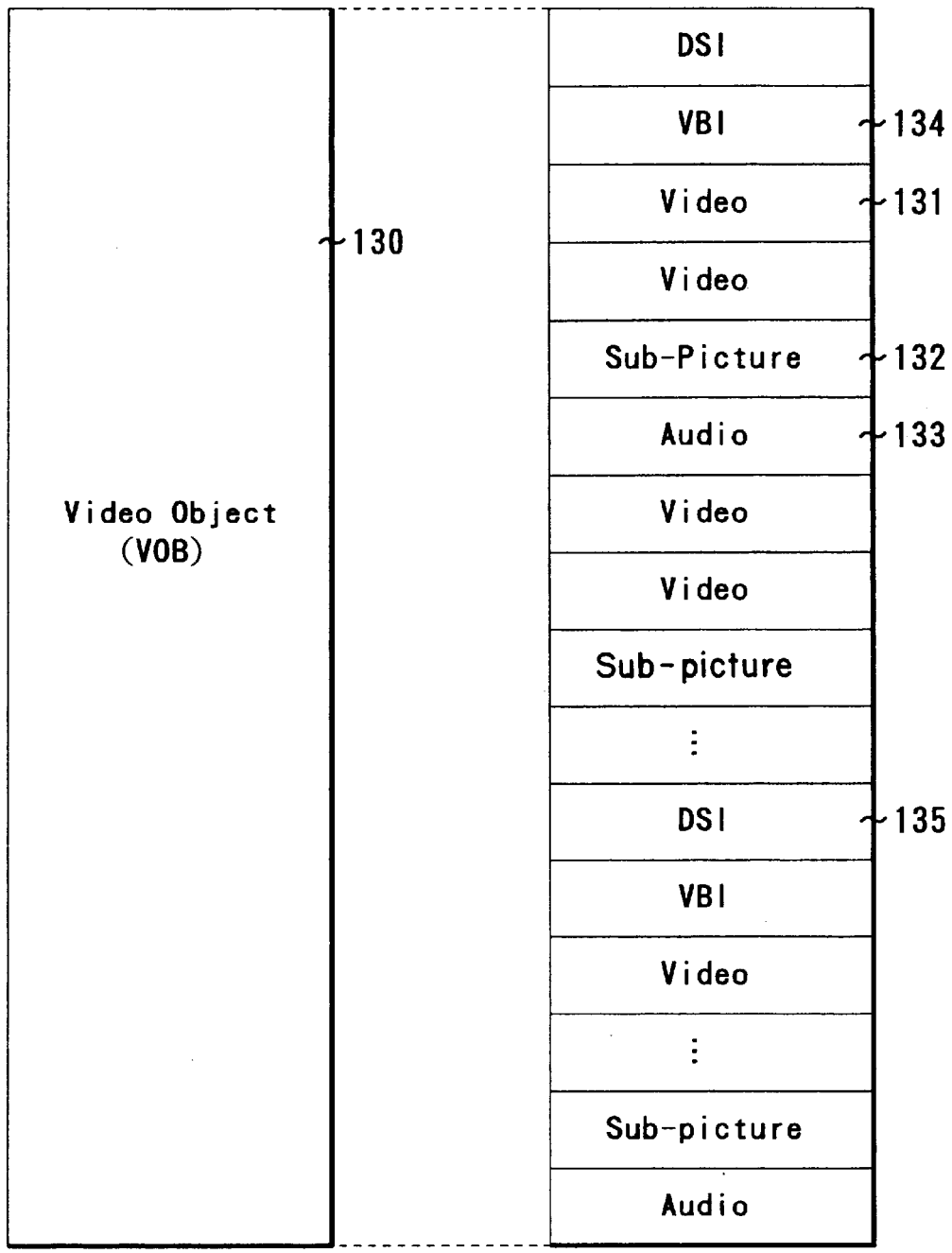
FIG. 26 is a diagram illustrating the structure of the video object included in the volume information file and the title set, both shown in FIG. 4.

Both the video object (VOBVMM) 96 for the volume menu and the video object (VOBTSM) for the title set menu have a structure identical to that of a video object 130 shown in FIG. 26. As shown in FIG. 26, video packs 131, sub-picture packs 132, audio packs 133, video blanking (VBI) packs 134, data search information (DSI) packs 135 are laid out in the video object 130. The video object 130 is comprised of program streams prescribed in the system part of the MPEG standards (ISO/IEC 13818-1).

Figure 27:
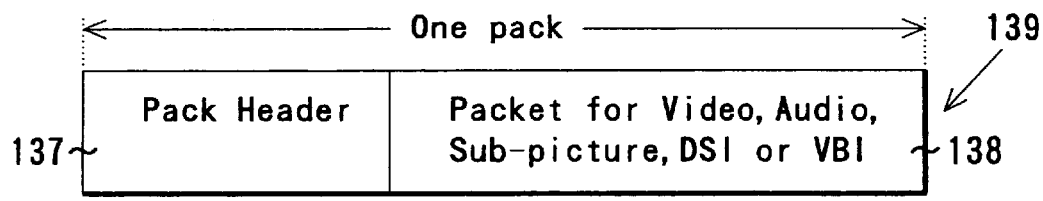
FIG. 27 is a diagram representing the structure of one of the packs which constitute the video object illustrated in FIG. 26.

Each of the packs 131 to 135 has the structure shown in FIG. 27, which complies with the MPEG standards. As shown in FIG. 27, the pack 139 consists of a pack header 137 and a packet 138; it has a length of 2048 bytes and is equivalent to one logic sector. The pack header 137 contains control data (e.g., time data). The packet 138 contains video data, audio data, sub-picture data, video blanking information (VBI) or data search information (DSI), and information for controlling these data and information items.

The video title set (VTS) 84 will be described, with reference to FIG. 28. As shown in FIG. 28, the video title set (VTS) 84 has five regions aligned on the boundary between logical sectors. The five regions are a video title set management information (VTSMI) 141, a video title set time search map table (VTSMAPT) 142, a video object for title set (VOBTS) 144, a video object title set menu (VOBTSM) 145, and a video object for volume menu (VOBVMM) 146. Described in the video title set management information (VTSMI) 141 are management information of the video title set (VTS) 86 (e.g., the attribute information of the VTS 86), and the program chain provided in the video title set (VTS) 86 or the information of the program. Described in the video title set time search map table (VTSMAPT) 142 is information such as the location at the the video data of each program chain of the video object (VOBTSM). The video object for title set (VOBTS) 144 has the same structure as the object 130 which has been described with reference to FIG. 26. The video object title set menu (VOBTSM) 145 corresponds to any video object (VOBTSM) 97 for the title set menu (shown in FIG. 5). In the volume information file 82, the video object (VOBTSM) 145 for the title set menu, provided in each video title set 84, is collected in the menu data region 82-2. Similarly, the video object for volume menu (VOBVMM) 146 corresponds to the video object (VOBVMM) 96 for the volume menu (shown in FIG. 5), and has the same structure as the video object (VOBTSM) 97 for the title set menu.

The relationship between an video object and cells and the relationship between each cell and various packs will be explained with reference to FIG. 29.

As has been indicated with reference to FIG. 4, each of the title sets 84 and 86 consists of at least one file 88, not exceeding 10 files. Each of the title sets 84 and 86 is comprised of five logic sectors, as described with reference to FIG. 28. The management information (VTSMI) 141, search map table (VTSMAPT) 142, and video objects (VOBTS, VOBTSM and VOBVMM) 144, 145 and 146 may be stored files 88, respectively. Alternatively, the management information (VTSMI) 141 and the search map table (VTSMAPT) 142 may be stored in a single file, and the video object, (VOBTS) 144 may be stored in one or more files 88. The video object (VOBTS) 144 is stored in two or more files 88 if the data reproduced is movie data.

As shown in FIG. 29, the video object 130 consists of a number of video cells 150, and each video cell 150 consists of a plurality of GOPs (Group of Pictures) 139. Among the GOPs 139 are a DSI pack, a VBI pack, video packs, sub-picture pack and audio packs. A movie story is a sequence of four major chapters, i.e., "introduction," "development," "turn," and "conclusion." These chapters correspond to programs. Thus, each program is defined as a group of video cells 150, and each object 130 consists of a plurality of programs. Serial numbers are assigned to these programs. A group of such programs is a program chain (PGC). Each object 130 may contain either program chain or two or more program chains.

It will be described how movie data is reproduced from the optical disk 10 which has the logic format shown in FIGS. 4 to 29, with reference to FIGS. 1, 30, 32 and 33. In FIG. 1, the arrows in solid lines indicate data buses, and the arrows in broken lines indicate control buses.

It will first be explained how to display the volume menu, with reference to the flow chart of FIGS. 30 and 31. The power switch (not shown) of the optical disk system shown in FIG. 1 is turned on, and the optical disk 10 is loaded in the disk drive section 30. In Step S10, the system CPU section 50 starts reading the initializing program from the system ROM/RAM section 52, thereby driving the disk drive section 30. Data is thereby read from the read-in area 27 of the optical disk 10. In Step S11, data is read from the volume management information area 70 which follows the lead-in area 27 and which has the volume and file structure which complies with ISO-9660. More precisely, the system CPU section 50 gives a read command to the disk drive section 30, whereby the data is read from the volume management information area 70. The data thus read is supplied via the system processor section 54 to the data RAM section 56 and is temporarily stored therein. In Step S12, the system CPU section 50 retrieves management information, such as the recorded position of each file and the volume of each file, from the path table and directory code stored in the data RAM section 56, transfers the management information to the system ROM/RAM section 52, and stores the information at the prescribed storage locations in the system ROM/RAM section 52.

In Step S13, the system CPU section 50 acquires the volume information file 82 corresponding to the file #0, from the system ROM/RAM section 52, in accordance with the recorded position of each file and the volume of each file which have been retrieved in Step S12. More correctly, the section 50 refers to the recorded position of the file and the volume thereof, gives a read command to the disk drive section 30, acquires the volume information file 82 corresponding to the file #0, and stores the file 82 into the data RAM section 56 through the system processor section 54. The volume information file manager (VMIFM) 91, i.e., the first table contained in the volume information file 82, is retrieved in Step S13.

In Step S14, the system CPU section 50 retrieves the volume information file management table (VMIFMT) 101. In Step S15, the section 50 acquires the start address (SAVMMPGCIBT) and end address (EAVMMPGCIBT) from the volume menu PGC information block table (VMMPGCIBT) 104 described in the volume information file management table (VMIFMT) 101, and also acquires the start address (SAVOBVMM) of the video object (VOBVMM) 96 for the volume menu.

In Step S16, the system CPU section 50 acquires the numbers of video streams, the number of audio streams, the number of sub-picture streams and the attributes of these streams—all described in the volume information file management table (VMIFMT) 101 retrieved in Step S14. Based on the attributes thus acquired, the section 50 sets parameters for reproducing the volume menu, in the video decoder section 58, the audio decoder section 60 and the sub-picture decoder section 62.

In Step S17, the system CPU section 50 acquires the volume menu PGC information block table (VMMPGCIBT) 104 from the start address (SAVMMPGCIBT) and end address (EAVMMPGCIBT) of the volume menu PGC information block table (VMMPGCIBT) 104, both acquired in Step S15. Then, in Step S18, the section 50 acquires the number (n) (NVMMLANG) of volume menu languages used in the volume menu, from the information (VMMPGCIBTI) 111 concerning the volume menu PGC information block table (VMMPGCIBT) 104 acquired in Step S17. In Step S19, the system CPU section 50 retrieves the m-th (m=0) pointer from the volume menu language block pointers (VMMLBSPs) 112 provided for the n languages contained in the table (VMMPGCIBT) 104, the number n having been acquired in Step S18. Further, the volume menu language code (VMMLCODE) for the language designated by the pointer (VMMLBSP) 112 retrieved is acquired in Step S19.

As shown in FIG. 31, the system CPU section 50 determines in Step S20 whether or not the volume menu language code (VMMLCODE) acquired in Step S19 for the m-th pointer (VMMLBSP) coincides with the language code preset in the optical disk system. If No in Step S20, the operation goes to Step S21, in which the section 50 reduces the number (n) of languages by one and acquires the volume menu language code (VMMLCODE) described in the (m+l)th volume menu language block pointer (VMMLBSP) 112. In Step S22, it is determine whether or not the number (n) of languages has been reduced to zero. If Yes in Step S22, it is determined in Step S23 that there are no language codes which coincide with the preset one, and the system CPU section 50 retrieves the m-th pointer (i.e. the first pointer) 112 again. Also in Step S23, the section 50 acquires the start address (SAVMMLB) of the volume menu language block (VMMLB) 113 described in the pointer (VMMLBSP) 112. In the optical disk system shown in FIG. 1 there is set the code for the language spoken in the country or region where the system is to be used. Thus, the code for Japanese is set in the system ROM/RAM section 52 if the optical disk system is to be used in Japan. Alternatively, the code for English is set in the section 52 if the system is to be used in the United States.

If Yes in Step S20, that is, if the language code (VMMLCODE) acquired in Step S19 coincides with the language code preset in the optical disk system, the operation jumps to Step S24. In Step S24, the system CPU section 50 acquires the start address (SAVLMMLB) of the volume menu language block (VMMLB) 113 described in the volume menu language block pointer (VMMLBSP) 112 which includes the language code (VMMLCODE), and further acquires the volume menu language block (VMMLB) 113 from the start address (SAVMMLB).

In Step S25, the system CPU section 50 determines the volume menu PGC information (VMMPGCI) 109 from the number of the title menu (NTM) and the title menu PGC information (IVMMPGCITM) corresponding to the number (NTM). The number (NTM) is provided in the volume menu language information (VMMLBI) 108 included in the volume menu language block (VMMLB) 113 acquired in Step S24. The section 50 acquires the relative start address (CFPLSN) of the video object for the volume menu which constitutes the first title menu described in the volume menu PGC information (VMMPGCI) 109.

In Step S26, the system CPU section 50 determines the volume menu PGC information (VMMPGCI) 109 from the number of the language menu (NLM) and the language menu PGC information (IVMMPGCILM) corresponding to the number (NLM). The number (NLM) is provided in the volume menu language information (VMMLBI) 108 included in the volume menu language block (VMMLB) 113. The section 50 acquires the relative start address (CFPLSN) of the video object for the volume menu which constitutes the first language menu described in the volume menu PGC information (VMMPGCI) 109.

In Step S27, the system CPU section 50 adds the relative start addresses of the volume menu video objects, which have been acquired in Step S25 and Step S26, respectively, to the start address (SAVOBVMM) which pertains to the volume menu video object (VOBVMM) 96 and which has been acquired in Step S15. A volume menu program chain is thereby obtained from the volume menu video object (VOBVMM) 96. The data cells forming this program chain are supplied to the video decoder section 58, audio decoder section 60 and sub-picture decoder section 62 through the system processor section 54. The decoder sections 58, 60 and 62 decode the data cells into digital data. The D/A and data-reproducing section 64 converts the digital data to an analog video signal and an analog audio signal. The video signal is supplied to the monitor section 6, and the audio signal to the speaker section 8. The monitor section 6 displays a visual volume menu, and the speaker section 8 generates an oral volume menu. The monitor section 6 can display a volume menu which consists of, for example, the trademark of the movie production and a caption "Collection of Movies Starring Mr. A: Volume I".

Figure 33:
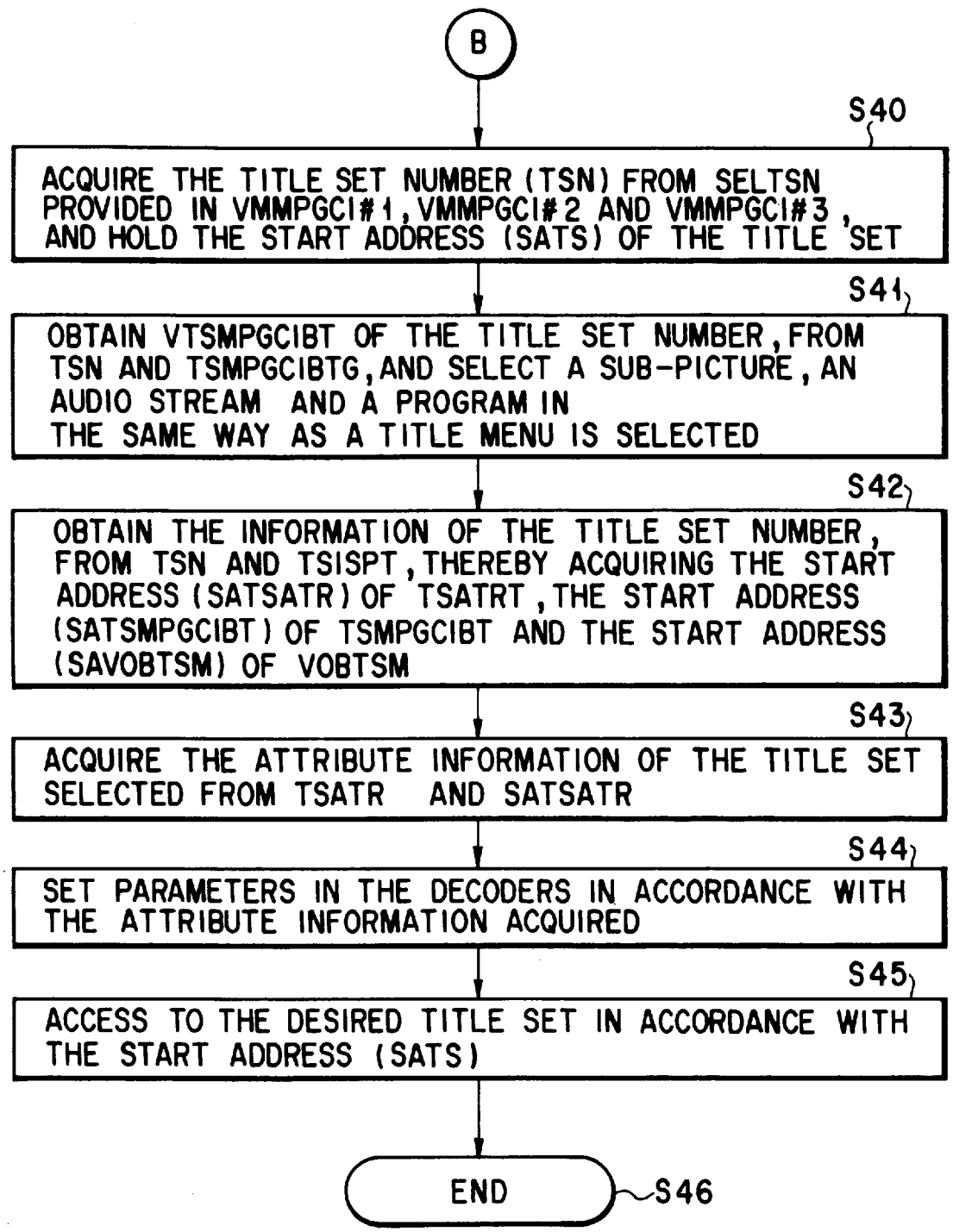
Figure 34:
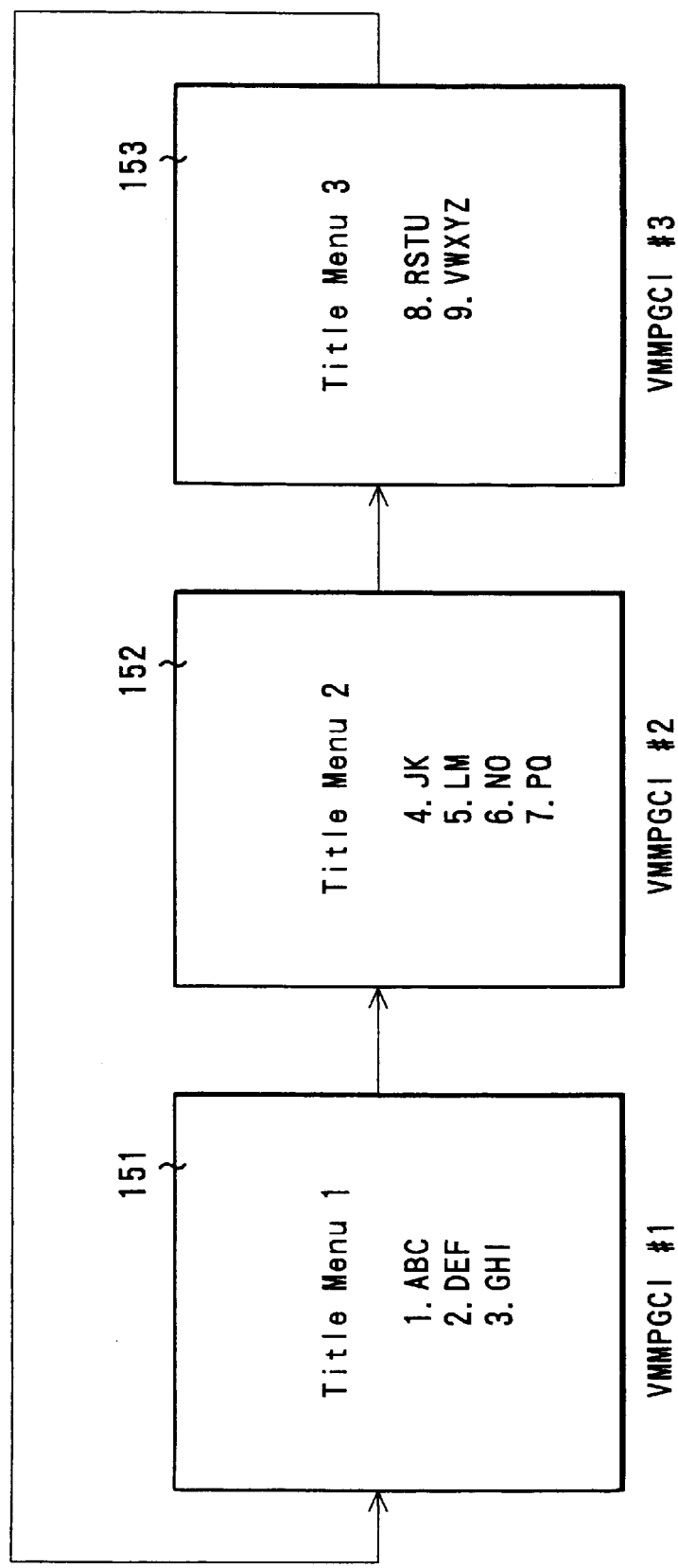
FIG. 34 is a diagram illustrating title menus which can be displayed in the monitor section shown in FIG. 1 and can be cyclically switched.

It will now be explained how to display the title menu and how to select one title from among those displayed in the menu, with reference to the flow chart of FIGS. 32 and 33. Assume that the volume information file 82 (FIG. 5) contains a plurality of title menus, for example three title menus. In this case, it is determined in Step S24 (FIG. 31) that the file 82 contains three title menus (NTM=3), and in Step S24 there are acquired the title menu PGC information (IVMMPGCITM) corresponding to the number NTM (=3) and the volume menu PGC information (VMMPGCI) corresponding to the information (IVMMPGCITM). To select one title, VMMPGCI#1, VMMPGCI#2 and VMMPGCI#3 are cyclically switched by operating the key/display section 4, thereby to switch the menus displayed. VMMPGCI#1 describes the start address (CFPLSN) of the video data item, the number (SELTSN) of titles which can be selected, the title set serial number (TSN) and the start address (SATS) of the title set—all for the title menu 151 shown in FIG. 34. VMMPGCI#2 describes the start address (CFPLSN), the number (SELTSN) of titles, the title set serial number (TSN) and the title set start addresses (SATS)—all for the title menu 152 shown in FIG. 34. VMMPGCI#3 describes the start address (CFPLSN), the number (SELTSN) of titles, the title set serial number (TSN) and the title set start addresses (SATS)—all for the title menu 153 shown in FIG. 34. To select the desired title menus from among the three, the user operates the key pad provided in the key/display section 4, thereby inputting the number assigned to the desired title menu. To select one of the sub-pictures or one of the audio data items, which are included in the title set, the user operates the key/display section 4. Each of the title menus 151, 152 and 153 shown in FIG. 34 is represented by one or more data cells. In each title menu displayed, the background may be either a still picture or a moving picture, signs, symbols and title names are displayed in the form of sub-pictures and, it required, an audio is reproduced for voice navigator. The data representing each title menu, which is defined by one or more data cells, is treated as a program chain.

Figure 32:
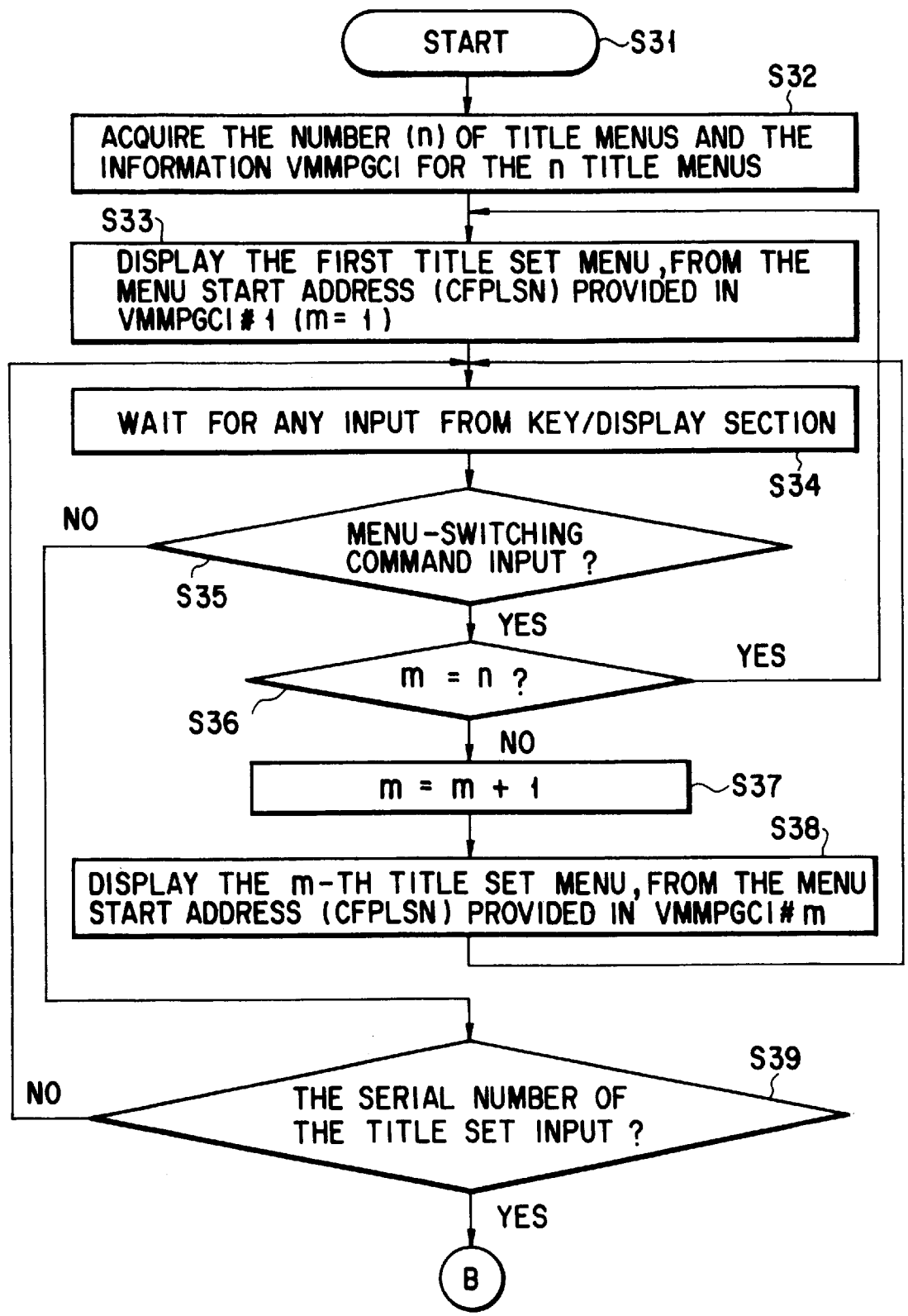
FIGS. 32 and 33 are a flow chart explaining various operations, from the displaying of a title menu to the selection of a title.

The selection of a video title set 84 or an audio title set 86 is started in Step S31 as shown in FIG. 32. At first, in Step S32 the system CPU section 50 acquires the number (NTM) (n) of the title menus and the volume menu PGC information (VMMPGCI) for the n title menus. In Step S33, the first title set menu 151 (m=1) is displayed, from the menu start address (CFPLSN) provided in the first volume menu PGC information (VMMPGCI#1). In Step S34, the system CPU section 50 waits for any input from the key/display section 4. In Step S35, the section 50 determines whether or not a menu-switching command has been input from system CPU section 50 the key/display section 4. If Yes in Step S35, the operation goes to Step S36, in which the section 50 determines if m=n. If Yes in Step S36 (m=n), the operation returns to Step S33. If No in Step S36 (m=n), the operation goes to Step S37. In Step S37, the system CPU section 50 increases the value of m by one (m=m+1). Then, in Step S38, the m-th title set menu is displayed, from the menu start address (CFPLSN) provided in the next volume menu PGC information (VMMPGCI#m). In Step S39, the system CPU section 50 determines whether or not the serial number of a title set 84 has been input from the key/display section 4. If No in Step S39, the operation returns to Step S35. If Yes in Step S39, the operation goes to Step S40 (FIG. 33), in which the section 50 acquires the title set number (TSN) from the number (SELTSN) (n) of titles which can be selected in VMMPGCI#1, VMMPGCI#2 and VMMPGCI#3, and holds the start address (SATS) of the title set 84.

In Step S41, the system CPU section 50 obtains the video title set PGC information block table (VTSMPGCIBT) 121 of the title set number (TSN), from the title set number (TSN) acquired in Step S40 and the title set menu PGC information block table group (TSMPGCIBTG) 95, and selects a sub-pictures, an audio stream and a program in the same way as a tile menu is selected.

In Step S42, the system CPU section 50 obtains the information of the title set number (TSN), from the title set number (TSN) acquired in Step S40 and the title set information search pointer table (TSISPT), thereby acquiring the start address (SATSATR) of the title set attribute table (TSATRT) 94, the start address (SATSMPGCIBT) of the title set menu program chain block table (TSMPGCIBT) 119 and the start address (SAVOBTSM) of the title set video object (VOBTSM). In Step S43, the section 50 acquires the attribute information of the title set (sub-pictures, audio data items) selected in Step S43, from the title set attribute table (TSATRT) 94 and the start address (SATSATR) thereof acquired in Step S42. In Step S44, the section 50 sets parameters in the decoder sections 58, 60 and 62 in accordance with the attribute information acquired in Step S43. These parameters are necessary in reproducing the title set. In Step S45, the system CPU section 50 makes access to the title set 84 in accordance with the start address (SATS) of the title set 84, which is held in Step S40. As a result, a title menu is obtained. In Step S46, a movie title is selected from the title menu obtained in Step S45, whereby the movie is played back.

The system CPU section 50 reads the video title set management information (VTSMI) 141 of the title set 84 from the optical disk 10, stores the information (VTSMI) 141 into the system ROM/RAM section 52, and acquires information for managing various data items about the title set 84, such as the size of the title set 84. In accordance with the management information, the section 50 reads from the optical disk 10 the program chain corresponding to the movie title selected in Step S46. That is, the data cells forming the program chain selected are read from the video object (VOBTS) 144, one after another, and input to the data RAM section 56 through the system processor section 54. The data cells are supplied to the video decoder section 58, audio decoder section 60 and sub-picture decoder section 62, in accordance with playback information. The decoder sections 58, 60 and 62 decode the data cells into digital data. The digital data is input to the D/A and data-reproducing section 64. The section 64 converts the digital data to an analog video signal and an analog audio signal. The video signal is supplied to the monitor section 6, which displays the movie. The audio signal is supplied to the speaker section 8, generates sound and speech.

A method of recording data on the optical disk 10 such that video data and audio data can be reproduced in the logic formats shown in FIGS. 4 to 29, and a system for recording data by this data-recording method, will be described with reference to FIGS. 35, 36 and 37.

FIG. 35 shows an encoder system designed to encode video data, thereby to form the video data file 88 of the title set 84. As shown in FIG. 35, a video tape recorder (VTR) 201, an audio tape recorder 202 and a sub-picture source 203 are used as sources of video data, audio data and sub-picture data, respectively. The recorders 201 and 202 and the source 203 generate video data, audio data and sub-picture data, respectively, under the control of a system controller (Sys Con) 205. The video data, the audio data and the sub-picture data are supplied to a video encoder (VENC) 206, an audio encoder (AENC) 207 and a sub-picture encoder (SPENG) 208. The encoders 206, 207 and 208 perform A/D conversion on the input analog data items and encode them in data-compression mode, under the control of the system controller 205. The encoded video data (Comp Video), the encoded audio data (Comp Audio) and the encoded sub-picture data (Comp Sub-pic) are stored into memories 210, 211 and 212, respectively. The system controller 205 reads the video data (Comp Video), audio data (Comp Audio) and sub-picture data (Comp Sub-pic) from the memories 210, 211 and 212 and supplies them to a file formatter (FFMT) 214. The file formatter 214 converts the input data items to a video data file, containing management data items such as the setting conditions and attributes of the video, audio and sub-picture data items. The system controller 205 stores the video data file into a memory 216.

A standard method in which the system controller 205 forms a video data file will be explained.

Figure 36:
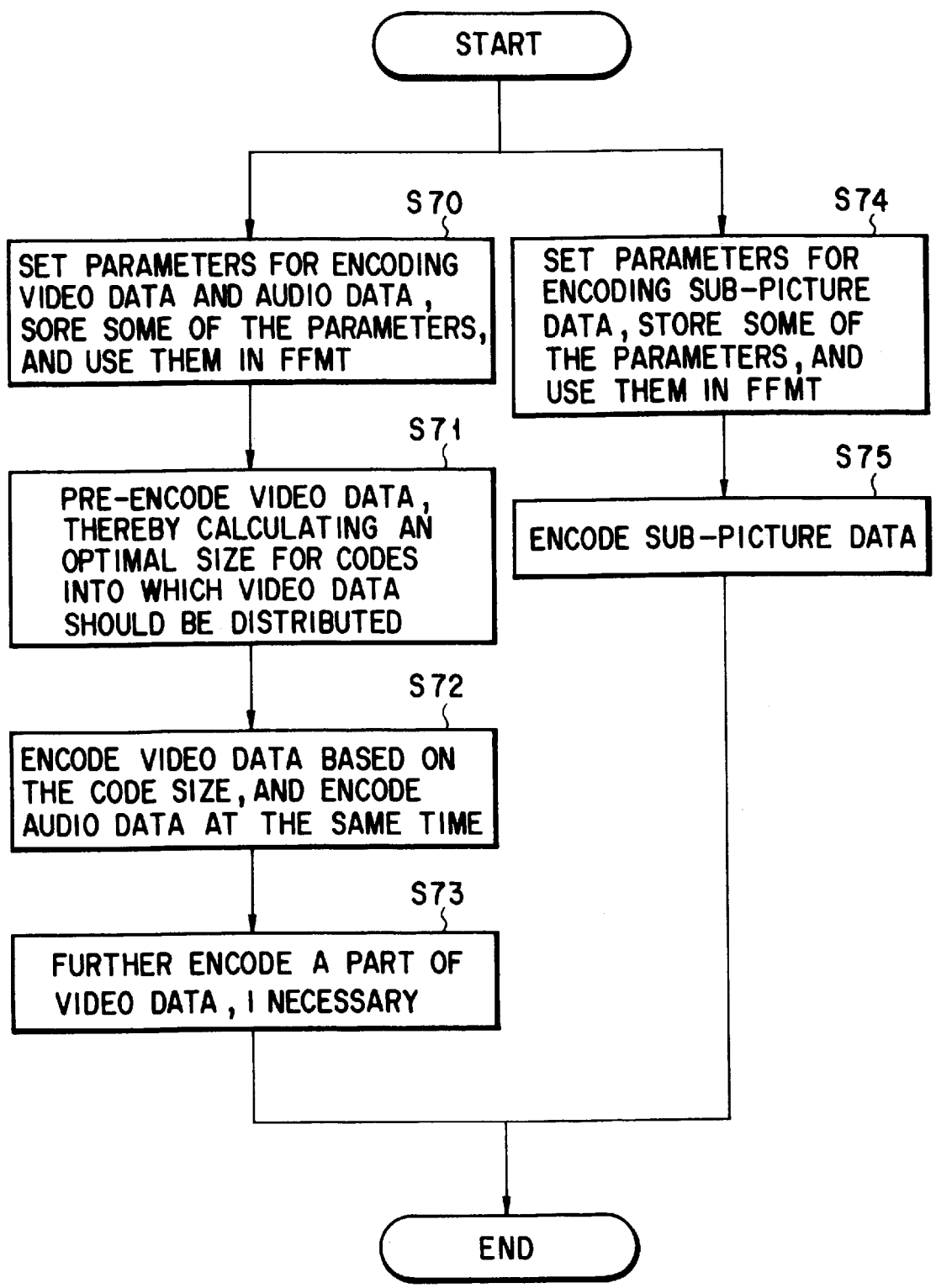
FIG. 36 is a flow chart explaining the operation of the encoder system.

First, the video data and the audio data are encoded into encoded video data (Comp Video) and encoded audio data (Comp Audio), as shown in the flow chart of FIG. 36. More specifically, in Step S70, the parameters for encoding the video data and the audio data are set. Some of the parameters are stored in the system controller 205 and are used in the file formatter 214. In Step S71, the video data is pre-encoded in accordance with the parameters, thereby calculating the optimal size for codes into which the video data should be distributed. In Step S72, the video data is encoded based on the code size obtained in Step S71. The audio data is also encoded in Step S72. In Step S73, a part of the video data is further encoded, if necessary. Namely, the video data and the audio data are encoded in the sequence of Steps S70 to S73.

In the meantime, the parameters for encoding the sub-picture data are set in Step S74. Some of these parameters are stored in the system controller 205 and are used in the file formatter 214. In Step S75, the video data is pre-encoded in accordance with the parameters.

To be more specific, the encoded video data (Comp Video), the encoded audio data (Comp Audio) and the encoded sub-picture data (Comp Sub-pic) are combined into a video data file which has the format shown in FIG. 28, as will be explained with reference to the flow chart of FIG. 37.

To be more specific, in Step S76, a data cell 150 is generated as the minimum unit of the video data, and the cell information (CI) about the data cell 150 is formed. In Step S77, the configuration of data cells constituting a program chain and the attributes of the video data, the sub-picture data and the audio data are set, and management information (VTSMI) 141 and a search map table (VTSMAPT) 142 are generated. (Some of these attributes are information once used in encoding the video, audio and sub-picture data items. The information (VTSMI) includes information about the program chain.) In Step S78, the video data, audio data and sub-picture data (Comp Video, Comp Audio and Comp Sub-pic) are divided into packs, and control (DSI) packs are inserted, each for one IGOP, so that the data items may be reproduced in the order of time codes. As a result, a title set 86 having the format shown in FIG. 28 and including one or more video files is provided.

The information about the program chain is described in Step S77 as program chain information (PGCI), either by using the data base provided in the system controller 205 or by, if necessary, inputting the video data, audio data and sub-picture data again.

FIG. 38 illustrates a disk formatter system which is designed to format the title sets 84 and 86 as described above and record them on the optical disk 10. As seen from FIG. 38, the title sets 84 and 86 (i.e., file data items) are read from memories 220 and 221 and supplied to a volume formatter (VFMT) 226. The volume formatter 226 acquires management information from the title sets 84 and 86 and generates a volume information file 82. Namely, logic data items are formed in the order shown in FIG. 4 so that they may be recorded on the optical disk 10. The logic data formed by the volume formatter 226 is supplied to a disk formatter (DFMT) 228. The disk formatter 228 adds error-correcting data to the logic data and converts the logic data to physical data. The physical data is input to a modulator 230, which modulates the physical data to data which can be actually decoded on the optical disk 10. The data output from the modulator 230 is supplied to a recorder 232. The recorder 232 records the data on the optical disk 10.

A standard method of generating data to be recorded on the disk 10 will now be explained, with reference to FIGS. 39 and 40.

FIG. 39 is a flow chart explaining how to generate logic data to be recorded on the optical disk 10. As shown in FIG. 39, various parameters, such as the number of video data files, the order in which the files are arranged and the sizes of the files, are set in Step S80. Then, in Step S81, volume information is generated from the parameters and the management information for the video data files. In Step S82, the volume information and video data files are merged in the order indicated by the logic block numbers assigned to the volume information and the video data files, thereby forming logic data to be recorded on the disk 10.

Thereafter, physical data to be recorded on the disk 10 is generated as will be explained with reference to FIG. 40. First, in Step S83, logic data is divided into units each consisting of a prescribed number of bytes, and error-correcting data items are generated. Next, in Step S84, each logic data unit is combined with one error-correcting data item, providing a physical sector. In Step S85, the physical sectors are combined into physical data. The physical data is modulated into data which can be actually recorded on the disk 10, in accordance with specific rules as has been described with reference to the flow chart of FIG. 40. Thereafter, this data is recorded on the optical disk 10.

As has been described, one or more title sets and volume file information for managing the title set or title sets are recorded on the large-capacity recording medium according to the present invention. Each of the title sets consists of a plurality of files which are provided in the form of logic sectors. Each title set contains information for managing the title set and data to be reproduced, which are stored in different files. To retrieve any desired title set from the recording medium, the volume information file is first read from the medium, thus acquiring the information about the desired title set from the volume information file. Then, the management information for the desired title set is obtained. The volume information file manages at least one title set, however large is the storage capacity of the recording medium, and each title set contains title set management information. Hence, any desired data can be reproduced from the medium reliably and quickly.

The volume information file, which is used to select one of the volumes recorded on the medium, has selection information useful in reproducing the volume, such as a language menu, and also selection information useful in selecting one of the title sets, such as a title set menu which helps a user to select a title, a sub-picture language, and a type of audio data. The desired data can be quickly selected and reproduced quickly, by referring to the volume information file.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A reproducing apparatus for reproducing a menu from an optical disc having a lead-in area, a lead-out area, and a recorded data area defined between the lead-in area and the lead-out area, wherein the recorded data area comprises a first menu area that stores a first language menu data for displaying a first language menu and a menu selection area that stores selection data for selecting at least the first language menu data, the first language menu data including at least one data cell including video and sub-picture packs to which video and sub-picture data are stored, respectively, the video data of the video pack being capable of displaying a background of the first language menu and the sub-picture data of the sub-picture pack being capable of displaying a sub-picture on the background, and the selection data comprising an address for indicating a location of the first menu area and a first language code for specifying the first language displayed on the first language menu, the reproduction apparatus comprising:

storing means for storing a predetermined language code;

retrieving means for retrieving the menu selection area to read the first language code;

comparing means for comparing the first language code with the predetermined language code and generating a first coincident signal when the first language code coincides with the predetermined code;

causing means for causing the retrieving means to retrieve an address of the first menu area in response to the first coincident signal, access the first menu area with the address and read out the menu data from the first menu area;

decoding means for decoding the video and sub-picture packs of the menu data to generate a video signal and a sub-picture signal; and outputting means for outputting the video signal and the sub-picture signal so as to display a background picture produced based on the video signal and a sub-picture on the background picture, the sub-picture being produced based on the sub-picture signal.

2. The reproducing apparatus of claim 1, wherein:

the recorded data area comprises a second menu area in which second language menu data for displaying a second language menu is stored, wherein the second language menu comprises at least one data cell including video and sub-picture packs to which video and sub-picture data are stored, respectively;

the menu selection data comprises an address for indicating a location of the second menu area, and a second language code for specifying the second language displayed on the second language menu;

the retrieving means retrieves the menu selection area to read the second language code;

the comparing means compares the second language code with the predetermined language code, and generates a second coincident signal when the second language code coincides with the predetermined code; and the causing means causes the retrieving means to retrieve the address of the second menu area in response to the second coincident signal, access the second menu area with the address, and read out the menu data from the first menu area.

3. The reproducing apparatus of claim 1 or 2, wherein:

the recorded data area comprises at least one video title set area in which a video title seat is stored, the video title set including a video object data consisting of a plurality of the data cells each storing data to be reproduced, and a management information file storing information for managing a reproduction order in which the data cells are to be reproduced, each of the data cells including a combination of video pack, audio pack or sub-picture pack, the retrieving means reads the management file and reads the data cells in accordance with the order;

the decoding means decodes the video pack, the audio pack and the sub-picture pack in the cells to a video signal, an audio signal and sub-picture signal; and the outputting means outputs the video signal, audio signal, and sub-picture signal.

4. The reproducing apparatus of claim 3, wherein:

the recorded data area comprises a volume information file area that stores an information table for managing the video title set and a volume information file management table for managing the video title set and the volume of the optical disk; and the retrieving means reads the volume information file area, thereafter, to read the video title set.

5. The reproducing apparatus of claim 2, wherein:

the volume information file area and the video tide set area are aligned on a boundary of a logical sector.

6. A reproducing method of reproducing a menu from on optical disk having a lead-in area, a lead-out area, and a recorded data area defined between the lead-in area and the lead-out area, wherein the recorded data area comprises a first menu area that stores first language menu data for displaying a first language menu and a menu selection area that stores selection data for selecting at least the first language menu data, the first language menu data comprising at least one data cell including video and sub-picture packs to which video and sub-picture data are stored, respectively, the video data of the video pack being capable of displaying a background of the first language menu and the sub-picture data of the sub-picture pack being capable of displaying a sub-picture on the background, and the selection data comprising an address for indicating a location of the first menu area and a first language code for specifying the first language displayed on the first language menu, the reproduction method comprising:

storing a predetermined language code;

retrieving the menu selection area to read the first language code;

comparing the first language code with the predetermined language code and generating a first coincident signal when the first language code coincides with the predetermined code;

reading the address of the first menu area in response to the first coincident signal, accessing the first menu area with the address and reading out the first language menu data from the first menu area;

decoding the video and sub-picture packs of the menu data to generate video and sub-picture signals; and outputting the video and sub-picture signals so as to display a background picture produced based on the video signal and a sub-picture on the background picture, the sub-picture being produced based on the sub-picture signal.

7. The reproducing method of claim 6, wherein:

the recorded data area comprises a second menu area in which second language menu data for displaying a second language menu is stored, the second language menu data comprises at least one data cell including video and sub-picture packs to which video and sub-picture data are stored, respectively;

the menu selection data comprises an address for indicating a location of the second menu area, and a second language code for specifying the second language displayed on the second language menu;

the retrieving includes retrieving the menu selection area to read the second language;

the comparing includes comparing the second language codes with the predetermined language code, and generating a second coincident signal when the second language code coincides with the predetermined code; and the reading includes retrieving the address of the second menu area in response to the second coincident signal, accessing the second menu area with the address and reading out the second language menu data from the second menu area.

8. The reproducing method of claim 6 or 7, wherein:

the recorded data area comprises at least one video title set area that stores a video title set, the video title set including a video object data consisting of a plurality of the data cells that store data to be reproduced, and a management information file that stores information for managing a reproduction order in which the data cells are to be reproduced, each of the data cells including a combination of video pack, audio pack or sub-picture pack;

the retrieving includes reading the management file and reading the data cells in accordance with the order;

the decoding includes decoding the video pack, the audio pack and the sub-picture pack in the cells to a video signal, an audio signal and sub-picture signal; and the outputting includes outputting the video signal, audio signal, and sub-picture signal.

9. The reproducing method of claim 8, wherein:

the recorded data area comprises a volume information file area that stores an information table for managing the video title set and a volume information file management table for managing the video title set and the volume of the optical disk; and the retrieving includes reading the volume information file area, thereafter, to read the video title set.

10. The reproducing method of claim 7, wherein:

the volume information file area and the video title set area are aligned on a boundary on logical sector.

11. A recording apparatus for recording data on an optical disk having a recording area, comprising:

storing means for storing object data of video data, audio data, and sub-picture data to be reproduced and first language menu data of video data and sub-picture data which is related to a reproduction of the object data, the first language menu data being utilized for displaying a first language menu in which a selection item is displayed on a background, the selection item being produced based on the sub-picture data and the background being produced based on the video data;

encoding means for encoding the object data to video, audio, and sub-picture data packs, and the first language menu data to video and sub-picture menu data packs;

producing means for producing a first start address for indicating a first language menu area in the recording area of the optical disk and menu selection information including a first language code for specifying the first language menu data; and recording means for recording the video, audio and sub-picture packs as the video object data onto the recording area of the optical disk, and the video and sub-picture menu data packs as the first language menu data on the first language menu area, the first start address and the menu selection information on a menu selection information area in the recording area.

12. The recording apparatus of claim 11, wherein:

the storing means stores second language menu data of second video and sub-picture menu data which is related to a reproduction of the object data, the second language menu data being utilized for displaying a second language menu in which a second selection item is displayed on a background, the second selection item being produced based on the second sub-picture menu data and the background being produced based on the second video menu data;

the encoding means encodes the second language menu data to second video and sub-picture menu data packs;

the producing means produces a second start address for indicating a second language menu area in the recording area of the optical disk and second menu selection information including a second language code for specifying the second language menu data; and the recording means records the second video and sub-picture menu data packs on the second language menu area, the second stan address and the second menu selection information on a second menu selection information area in the recording area.

13. The recording apparatus of claim 11 or 12, wherein:

the encoding means includes means for generating cells, each cell consisting of a combination of video, audio, or sub-picture data packs;

the producing means includes means for generating a video title set having a management information for managing a reproduction order of the cells, and the cells, and a volume information file manager for managing the video title set and the volume of the optical disk; and the recording means records the volume information file manager and the video title set on the recording area in this order.

14. The reproduction method of claim 11, wherein:

the volume information file area and the video title set area are aligned on a boundary on logical sector.

15. A recording method of recording data on an optical disk having a recording area, comprising:

storing object data of video, audio, and sub-picture data to be reproduced and first language menu data of video and sub-picture data which is related to a reproduction of the object data, the first language menu data being utilized for displaying a first language menu in which a selection item is displayed on a background, the selection item being produced based on the sub-picture data and the background being produced based on the video data;

encoding the object data to video, audio, and sub-picture data packs, and the first language menu data to video and sub-picture menu data packs;

producing a first start address for indicating a first language menu area in the recording area of the optical disk and menu selection information including a first language code for specifying the first language menu data; and recording the video, audio and sub-picture packs as a video object data onto the recording area of the optical disk, and the video and sub-picture menu data packs as the first language menu data on the first language menu data, the first start address and the menu selection information on a menu selection information area in the recording area.

16. The recording apparatus of claim 15, wherein:

the storing includes storing second language menu data of second video and sub-picture menu data which is related to a reproduction of the object data, the second language menu data being utilized for displaying a second language menu in which a second selection item is displayed on a background, the second selection item being produced based on the second sub-picture menu data and the background being produced based on the second video menu data;

the encoding includes encoding the second language menu data to second video and sub-picture menu data packs;

the producing includes producing a second start address for indicating a second language menu area in the recording area of the optical disk and second menu selection information including a second language code for specifying the second language menu data; and the recording includes recording the second video and sub-picture menu data packs on the second language menu area, the second start address and the second menu selection information on a second menu selection information area in the recording area.

17. The recording apparatus of claim 15 or 16, wherein:

the encoding includes generating cells, each cell consisting of a combination of video, audio, or sub-picture data packs;

the producing includes generating a video title set having a management information for managing a reproduction order of the cells, and the cells, and a volume information file manager for managing the video title set for managing the video title set and the volume of the optical disk; and the recording includes recording the volume management information file table and the video title set on the recording area in this order.

18. The reproducing method of claim 15, wherein:

the volume information file manager and the video title set area are aligned on a boundary on logical sector.

* * * * *